(12) United States Patent
Kishimoto et al.

(10) Patent No.: US 6,339,566 B1
(45) Date of Patent: Jan. 15, 2002

(54) OPTICAL RECORDING/REPRODUCTION DEVICE

(75) Inventors: Takashi Kishimoto, Moriguchi; Katsuya Watanabe, Suita; Mitsurou Moriya, Ikoma; Takeharu Yamamoto, Takatsuki; Kouichi Ikeuchi; Kazushi Andoh, both of Onsen-gun, all of (JP)

(73) Assignee: Matshushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/713,223

(22) Filed: Nov. 16, 2000

Related U.S. Application Data

(62) Division of application No. 09/147,050, filed as application No. PCT/JP97/01021 on Mar. 26, 1997, now Pat. No. 6,181,651.

(30) Foreign Application Priority Data

Mar. 26, 1996 (JP) .............................................. 8-69671

(51) Int. Cl.$^7$ ................................................ G11B 7/09
(52) U.S. Cl. .................. 369/44.28; 369/44.34
(58) Field of Search ........................... 369/44.28, 44.27, 369/44.29, 44.32, 44.35, 44.34, 44.41, 44.14, 32, 47.1, 47.39

(56) References Cited

U.S. PATENT DOCUMENTS

| | | | | |
|---|---|---|---|---|
| 5,033,037 A | * | 7/1991 | Yanagi | 369/32 |
| 5,038,333 A | * | 8/1991 | Chow et al. | 369/44.28 |
| 5,063,549 A | * | 11/1991 | Yamamuro | 369/44.28 |
| 5,742,568 A | * | 4/1998 | Nakano et al. | 369/32 |

FOREIGN PATENT DOCUMENTS

| | | |
|---|---|---|
| EP | 0 090 379 | 10/1983 |
| JP | 58-166567 | 10/1983 |
| JP | 5-307755 | 11/1993 |
| JP | 6-103590 | 4/1994 |
| JP | 6-274901 | 9/1994 |
| JP | 8-167153 | 6/1996 |

* cited by examiner

Primary Examiner—Muhammad Edun
(74) Attorney, Agent, or Firm—Wenderoth, Lind & Ponack, L.L.P.

(57) ABSTRACT

A speed profile constituting the target speed for the next drive process during searching is generated by target speed generating section 140 and tracking actuator 132 is driven using the error signal in regard to the speed of movement of the light beam calculated by movement speed detection section 141 from a pulse signal obtained by converting the TE signal to binary form. Also linear motor 139 is driven using the difference signal obtained from the target speed and the speed of movement. Tracking actuator 132 is controlled so as to suppress swinging of focusing lens 107 during searching and linear motor 139 moves, during searching, under tracking control to a target speed.

28 Claims, 15 Drawing Sheets

1/3 STROKE (11.3MM, 15270 TRACKS)

CLOSE DISTANCE (WHEN MAXIMUM SPEED Vmax IS NOT REACHED)

OPTICAL RECORDING/REPRODUCTION DEVICE

This is a divisional application of application Ser. No. 09/147,050 filed Sep. 25, 1998 now U.S. Pat. No. 6,181,651 which is a 371 of PCT/JP97/01021 filed Sep. 25, 1998.

TECHNICAL FIELD

The present invention relates to an optical recording/reproduction device whereby information is optically recorded on a recording medium by using a light beam from a laser or the like, or recorded information is reproduced.

BACKGROUND ART

In a conventional optical recording/reproducing device, tracking control is performed by using a tracking actuator to move a focusing lens in the radial direction of the recording medium. Such a tracking actuator consists of a fixed section and a movable section on which is mounted the focusing lens, the fixed section and mobile section being coupled by means of four wires (linear members) or a resilient element such as a rubber element. When current is passed to a coil provided in the movable section, electromagnetic force is generated between it and a permanent magnet provided in the fixed section, causing the focusing lens to be moved by this electromagnetic force in the radial direction of the recording medium i.e. the direction perpendicular to the tracks.

Searching of a track containing desired information is performed by moving the entire optical head including the tracking actuator in the radial direction of the recording medium and counting the number of tracks on the recording medium that are crossed by the light beam. When, during searching, the optical head is moved at high speed in the radial direction of the recording medium, the focusing lens is subjected to inertial force, causing it to vibrate. In the conventional device, a speed sensor was provided that detected the speed of movement of the optical head, the signal of the speed sensor being differentiated to obtain an acceleration signal; the inertial force was cancelled by applying this acceleration signal to the tracking actuator, thereby reducing the vibration of the focusing lens (for example, Japanese Patent Laid-Open Publication No. Sho. 58-166567).

The prior art optical recording/reproducing device was subject to the problem that, since a speed sensor was required in order to reduce vibration of the tracking actuator during searching, the weight of the movable section of the optical head was increased, with the result that considerable power was required in order to perform fast searching. A further problem was that miniaturization of the optical head was difficult because of the speed sensor.

The present invention was made having regard to the above problems of the prior art. Its object is to provide an optical recording/reproducing device wherein swinging of the focusing lens during searching can be suppressed and high tracking pull-in performance ensured, and, in addition, which has fast and stable searching performance at low cost, thanks to controlling the speed of movement of the focusing lens during searching even under fluctuation of the drive sensitivity of the tracking actuator and traverse motor resulting from changes over time or temperature variation.

Furthermore, since, if the tracking capability of the traverse motor during tracking control is poor, feed control is performed with the focusing lens always in a displaced condition, with the result that very poor tracking jumps occur, an object is to provide an optical recording/reproduction device wherein the tracking capability of the traverse motor is improved and that provides high-precision feed control.

DISCLOSURE OF INVENTION

The present invention consists in a device for recording information onto a recording medium or reproducing recorded information comprising:

means for projecting a light beam that focus and project a light beam onto a recording medium;

first means for movement that move the means for projecting a light beam by a minute amount in a direction practically perpendicular to a track on the recording medium;

means for detecting track error that generate a signal corresponding to the positional relationship of the light beam and a track;

means for controlling tracking that drive the first means for movement in response to a signal of said means for detecting track error and that exercise control such that the light beam scans the track;

second means for movement that move the light beam crosswise in a direction approximately perpendicular to the track on the recording medium by moving the means for projecting a light beam; and means for controlling searching that move the light beam across a plurality of tracks to a desired track; wherein the means for controlling searching comprise:

means for generating a target speed that generate a target speed for movement of the light beam;

means for detecting speed of movement that detect the speed of movement of the light beam;

first means for driving that drive the first means for movement in response to a difference signal of a signal of the means for generating a target speed and a signal of the means for detecting speed of movement; and second means for driving that drive second means for movement in response to a difference signal of a signal of the means for generating a target speed and a signal of the means for detecting speed of movement.

BEST MODE FOR CARRYING OUT THE INVENTION

Embodiments of the present invention are described in detail below with reference to the drawings.

(First embodiment)

Figure 1:
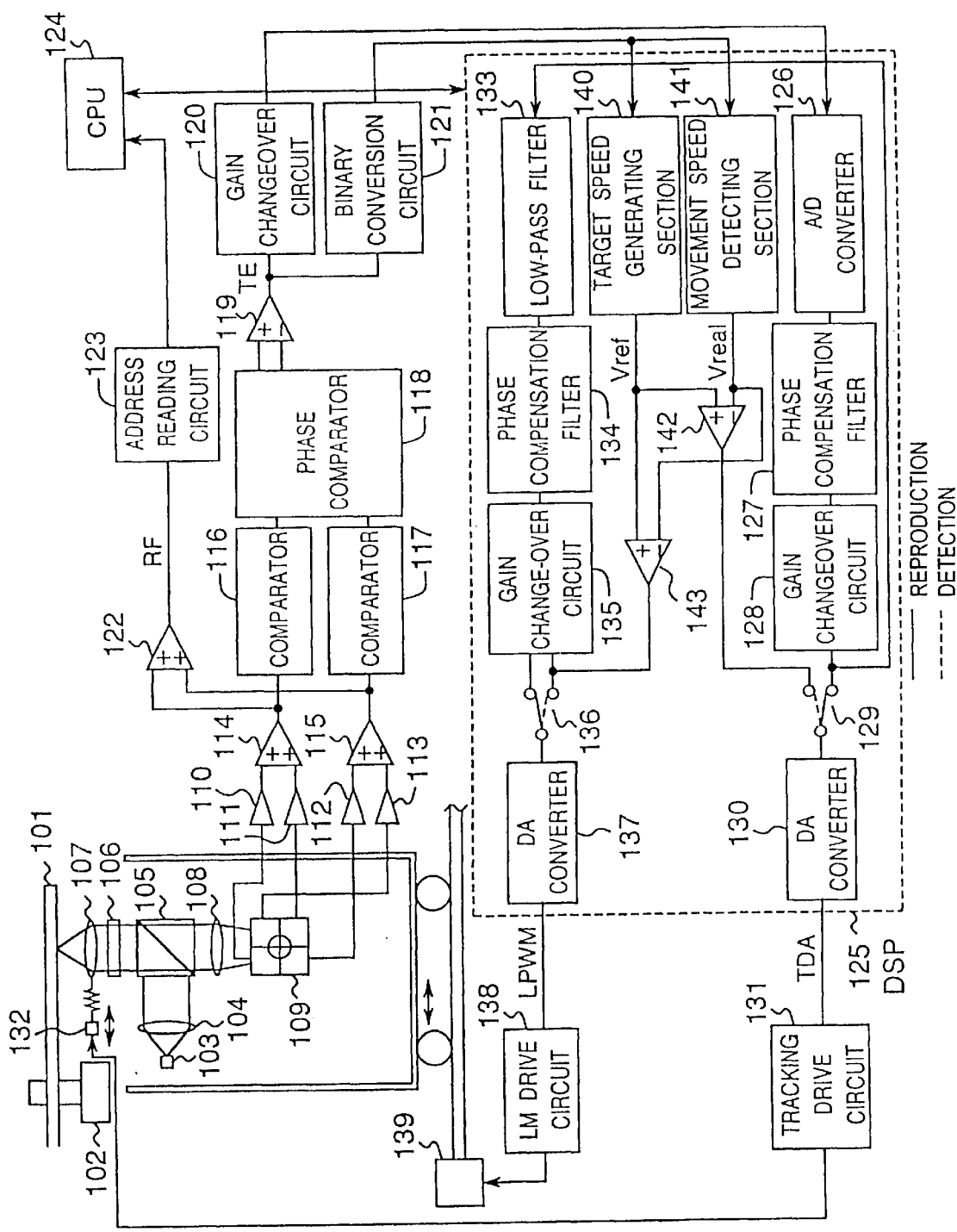
FIG. 1 is a block diagram illustrating the layout of an optical recording/reproduction device constituting a first embodiment of the present invention.

FIG. 1 is a block diagram showing the layout of an optical recording/reproducing device according to a first embodiment of the present invention.

An optical recording/reproducing device according to the present invention comprises: a disc motor 102 for rotating an optical disc 101 with prescribed speed of rotation, an optical head (comprising a light source such as a semiconductor laser 103, a coupling lens 104, a polarizing beam splitter 105, a polarizing plate 106, a focusing lens 107, a converging lens 108, and a photodetector 109 divided into four sectors) for reproducing information from optical disc 101, and a linear motor 139 for moving the entire optical head in a direction perpendicular to the direction of the tracks of optical disc 101.

After the light beam generated by light source 103 has been turned into parallel light by means of coupling lens 104, it is reflected by polarizing beam splitter 105, passes through polarizing plate 106, and is focused by focusing lens 107, thereby forming a light beam spot having a focal point in the thickness direction of optical disc 101. This light beam spot is formed on optical disc 101 which is being rotated by disc motor 102.

The light reflected from optical disc 101 passes through focusing lens 107, polarizing plate 106, and polarizing beam splitter 105, and is input through converging lens 108 to four-sector photodetector 109, which is a photodetector constructed of four sectors. The outputs of four-sector photodetector 109 are amplified by respective preamplifiers 110, 111, 112 and 113, and the signals positioned diagonally of four-sector photodetector 109 are added in adding amplifiers 114, 115. The outputs of adding amplifiers 114, 115 are input to a focusing control device (not shown), a positional error signal of the focal point of the light beam and the optical disc 101 being detected from the difference of adding amplifiers 114 and 115. Focusing control is performed using this focusing position error signal such that the focal point is positioned on optical disc 101. Detection of such a focusing position error signal is called the astigmatic method and is disclosed for example in Japanese Patent Laid-Open Publication No. Sho. 50-99561, whose disclosure constitutes part of the disclosure of the present application. Description of the construction and operation of the focusing control device is therefore omitted.

The tracking control device comprises comparators 116, 117, phase comparator 118, differential amplifier 119, gain changeover circuit 120, digital signal processor (DSP) 125, tracking drive circuit 131, and tracking actuator 132. The outputs of adding amplifiers 114, 115 are converted to binary form by respective comparators 116, 117 and input to a phase comparator 118. Phase comparator 118 performs phase comparison of the signals in binary form and inputs to differential amplifier 119 a signal corresponding to phase leading or phase lagging. The output signal of this differential amplifier 119 is a signal expressing the error of the focal point of the light beam on optical disc 1 and the track i.e. is a track error signal (TE signal) for exercising control such that the focal point of the light beam on optical disc 101 scans over the tracks. Detection of such a TE signal is called the phase difference method and is disclosed for example in Japanese Patent Laid-Open Publication No. Sho. 62-165737; this disclosure constitutes part of the present application.

The TE signal is applied to gain changeover circuit 120 where its amplitude is changed in accordance with the amount of light of the light beam corresponding to the reflectivity etc. of optical disc 101, it is adjusted to the prescribed amplitude (gain), and is input to digital signal processor (DSP) 125. For example, if the TE signal has a positive value, this indicates error from the target track in the outwards direction of the tracks; if the TE signal has a negative value, this indicates error from the target track towards the interior of the disc; thus, the value of the TE signal indicates the amount of error.

The TE signal is also input to a binary conversion circuit 121; if for example the TE signal has a positive value, the binary signal that is created is high, whereas if the TE signal has a negative value, it is set to low; this binary signal is input to DSP 125.

In DSP 125, there are provided switches 129 and 136. Each of these switches 129 and 136 may be set in a position indicated by the solid lines when tracking control needs to be performed i.e. when the optical recording/reproducing device is in a recording or reproduction mode, or may be set in a position indicated by dotted lines when the optical head needs to cross the tracks to move to another track i.e. in search mode. Consequently, switches 129 and 136 perform an action of opening/closing the loop of the tracking control system and an action of changing over the drive signal applied to tracking actuator 132 between the situations of tracking control (recording/reproduction mode) and searching (searching mode).

In the recording/reproduction mode, tracking control is performed and the TE signal is then applied to block 131 through blocks 126, 127, 128, 129 and 130. Also, in the recording/reproduction mode, the signal from block 128 is applied through blocks 133, 134, 135, 136 and 137 to block 138, so that feed control is also concurrently performed.

Also, in the search mode, searching control is performed. Under these conditions, the binary signal, in the embodiment shown in FIG. 1, is applied through blocks 140, 141, 142, 129 and 130 to block 131 and through blocks 140, 141, 143, 136 and 137 to block 138.

First of all, the recording and reproducing mode will be described. In this case, as described above, switches 129 and 136 are both set in the positions shown by the solid lines.

After having been adjusted to the prescribed gain, the TE signal is converted by AD converter 126 from an analog signal into a digital signal and is input to phase compensation filter 127, which is a digital filter constituted by an adder, multiplier and delay device. Phase compensation filter 127 compensates the phase of the tracking control system. The TE signal whose phase has been compensated in phase compensation filter 127 is input to switch 129 through a gain changeover circuit 128 that changes over the loop gain of the tracking control system.

Since switch 129 is set in the position shown by the solid line during recording/reproduction, the TE signal that has passed through switch 129 is converted by DA converter 130 from a digital signal to an analog signal, which is input to tracking drive circuit 131. Tracking drive circuit 131 drives tracking actuator 132 after subjecting the tracking control signal to a suitable degree of current amplification and level conversion. In this way, tracking control is implemented by tracking actuator 132 being driven such that the focal point of the optical beam on optical disc 101 scans a prescribed track.

After passing through gain changeover circuit 128, the TE signal is also input to low pass filter 133 that restricts its frequency band and removes noise, and then, after passing through low pass filter 133, is input to a phase compensation filter 134 that compensates the phase of the feed control system. Just like phase compensation filter 127, low pass filter 133 and phase compensation filter 134 are digital filters constituted of an adder, multiplier and delay device. The output of phase compensation filter 134 passes through gain changeover circuit 135 that changes over the gain of the feed control system and is fed, through switch 136, which is in the position indicated by the solid line, to DA converter 137. It is then converted by DA converter 137 from a digital signal to an analog signal, which is input to linear motor drive circuit 138, where it is subjected to suitable current amplification and level conversion. Linear motor 139 is driven by the output of linear motor drive circuit 138, feed control being implemented wherein linear motor 139 is driven such that the focal point of the light beam coincides with the center of focusing lens 107 when the focal point of the light beam on optical disc 101 is scanned along a track i.e. such that the optic axis of the light beam that is focused on to optical disc 101 coincides with the optic axis of focusing lens 107.

Next, searching mode will be described. In this case, as described above, switches 129 and 136 are both set in the positions indicated by the dotted lines.

The outputs of adding multipliers 114, 115 are also input to adding amplifier 122. The output signal RF of adding amplifier 122 is a signal corresponding to the total amount of reflected light from optical disc 101, so the track addresses on optical disc 101 can be read by processing this signal in address reading circuit 123. The address that is read by this address reading circuit 123 is input to microprocessor (CPU) 124, which recognizes the track address where the optical beam is located.

When a desired track address is input to CPU 124, CPU 124 reads the track address where the light beam is currently located and calculates the number of tracks through which it should be moved from the difference from the desired track address and the current track address, and sends this to DSP 125.

Target speed generating section 140 generates an initial target speed signal using the number of tracks to be moved that it receives from CPU 124 and the track pitch of the optical disc 101 which constitutes the recording medium. This initial target speed signal is input to linear motor 139 through differential amplifier 143, switch 136, DA converter 137, and linear motor drive circuit 138, and is also input to tracking actuator 132 through differential amplifier 142, switch 129, DA converter 130, and tracking drive circuit 131, causing the light beam to move towards the target track.

When the light beam crosses a track, a sine wave TE signal is produced at the output of differential amplifier 119 and this TE signal is converted by binary conversion circuit 121 into a binary signal, which is input to the target speed generating section 140 and movement speed detection section 141 in DSP 125. The binary signal is a signal presenting a pulse waveform every time a track is crossed.

Target speed generating section 140 calculates the number of tracks of movement of the light beam to the target track by counting the output pulses of the binary circuit 121. Target speed generating section 140 is provided beforehand with information for generating a number of tracks for braking NB, a maximum speed Vmax, and accelerations A1, A2, and, using these items of information, it generates a target speed Vref constituting a speed profile corresponding to the track pitch of the optical disc 101 which is the recording medium and the number of tracks of movement to the target track.

Also, movement speed detection section 141 calculates the current movement speed Vreal of the light beam from the output pulses of binary conversion circuit 121. Specifically, when the movement speed of the optical beam becomes fast, the sine wave TE signal obtained on crossing the tracks becomes denser (of higher frequency); contrary, when the movement speed becomes slower, the TE signal becomes sparse (of lower frequency); thus, the current movement speed Vreal can be obtained from the pulse width of the output pulses of digital conversion circuit 121, or from their pulse separation.

Differential amplifier 143 outputs a difference signal of movement speed Vreal and target speed Vref, and this difference signal is input to linear motor drive circuit 138 through DA converter 137 and switch 136. Linear motor 139 is driven by the output signal of linear motor drive circuit 138, and is controlled so as to track the target speed Vref during searching. In this process, the calculation performed by differential amplifier 143 could consist merely of calculating the difference of the input signals, but searching can be performed faster and in a more stable fashion if the two input signals are respectively subjected to suitable amplification before calculating the difference and outputting the result.

Also, differential amplifier 142 outputs the difference signal of movement speed Vreal and target speed Vref, and inputs this difference signal to tracking drive circuit 131 through DA converter 130. Tracking actuator 132 is driven by the output signal of tracking drive circuit 131 and is controlled such as to suppress swinging of focusing lens 107 during searching.

Figure 2:
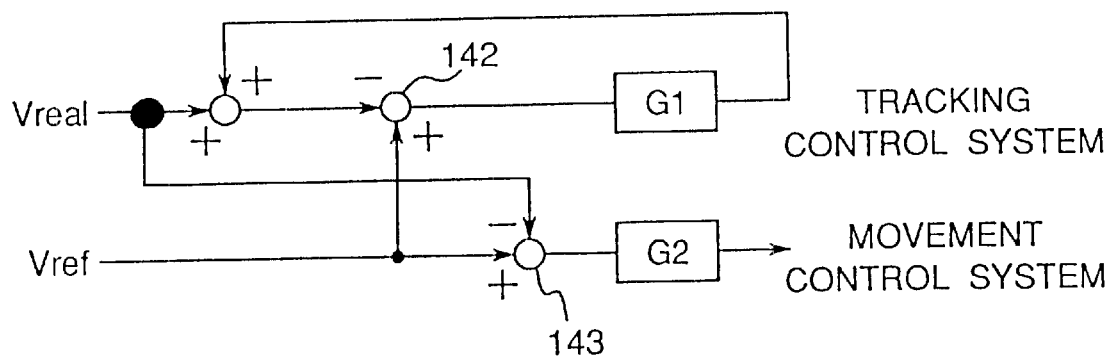
FIG. 2 is a block diagram showing the layout of a tracking control system and feed control system during searching in this embodiment.

The concept of the control performed by the tracking control system and feed control system during searching as described above will now be described with reference to the block diagram of FIG. 2. The tracking control system constitutes a closed loop with a transfer function G1 whose input is the difference signal between the target speed Vref generated by target speed generating section 140 and the movement speed Vreal detected by movement speed detection section 141. G1 is the closed loop transfer function for one complete circuit of the tracking control system constituted by tracking actuator 132 and tracking drive circuit 131 etc. By means of this closed loop control system, the movement speed Vreal is controlled so as to coincide with the target speed Vref.

Also, in the feed control system, an open loop is constituted by a transfer function G2 that inputs the difference signal of the target speed Vref and the movement speed Vreal. G2 is the open loop transfer function of the feed control system constituted by linear motor 139 and linear motor drive circuit 138 etc. By means of this open loop control system, linear motor 139 effects movement while being controlled such that it tracks the target speed Vref.

Figure 3:
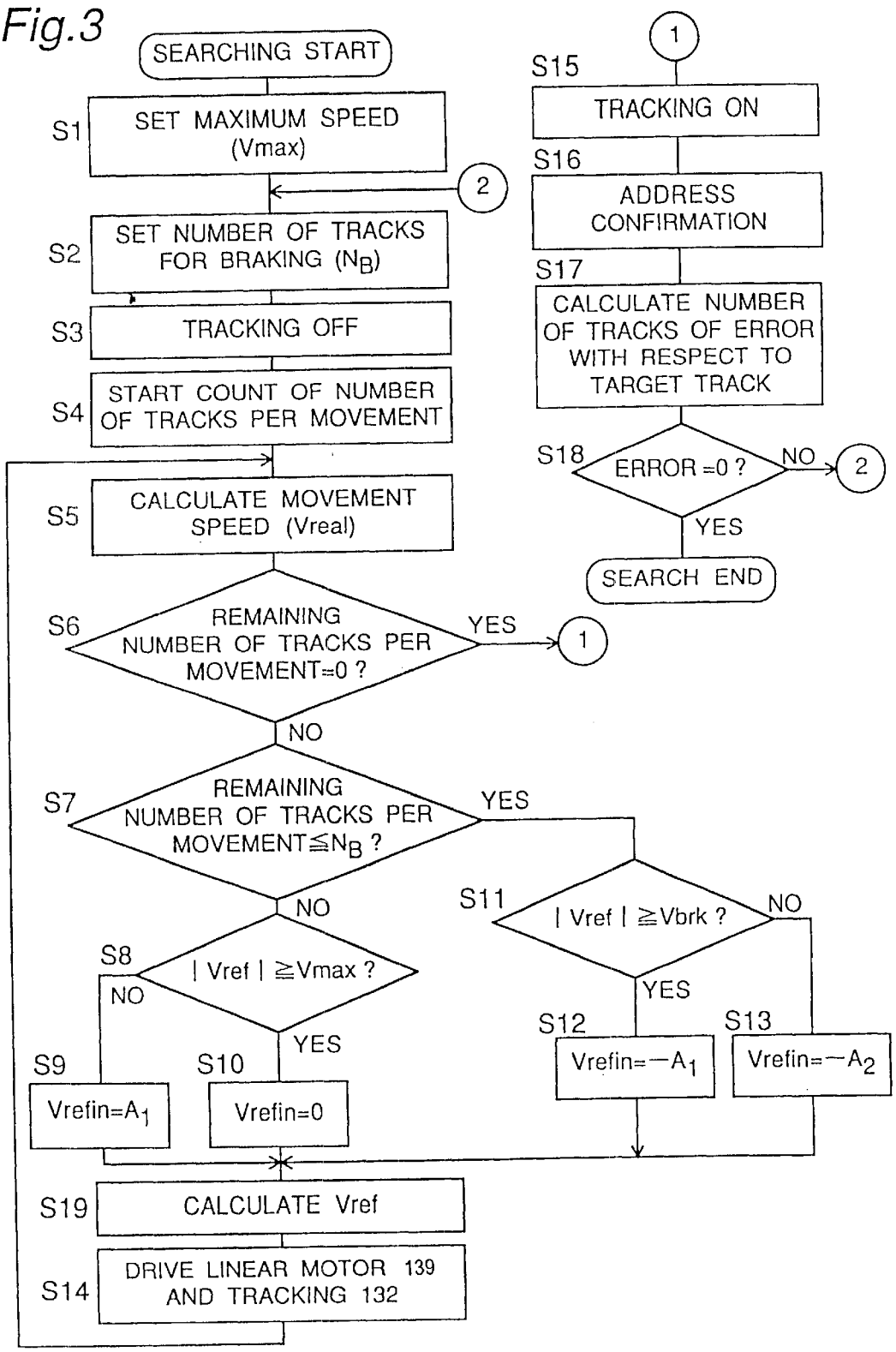
FIG. 3 is a flow chart showing the flow of processing of searching in this embodiment.

The method of searching using an optical recording/reproducing device as described above is described below with reference to the flow chart of FIG. 3.

When a search command is issued from CPU 124, in steps S1 and S2, DSP 125 sets the movement target maximum speed Vmax of the light beam during searching, and the number of tracks for braking NB, that determines the number of remaining tracks across which movement is to be effected at which, or at less than which, deceleration of linear motor 139 is to be commenced. If the number of tracks of movement from the current track to the target track is N, the number of tracks for braking NB is determined for example using the following calculation expression.

When $10 \leqq N < 590$ $$NB = 0.7 \times N - 3$$

When $590 \leqq N < 3600$, $$NB = 0.5 \times N + 115$$

When $3600 \leqq N$, $$N = 1915$$

If N is 10 or less, search control is performed by a control system within DSP 125, not shown.

Since, for counting the number of tracks for movement of the light beam and detection of the movement speed, a pulse signal obtained by converting the TE signal to binary form by means of binary conversion circuit 121 is employed, if this binary conversion is not performed accurately, searching becomes unstable. A value of the maximum speed Vmax such that conversion to binary form can be performed accurately without adverse effect on amplitude of the TE signal, its S/N ratio, symmetry or frequency characteristic is therefore set beforehand in target speed generating section 140.

However, when the recording medium has a plurality of recording/reproduction faces, compared with the case of a single layer, reflectivity drops and the amount of light returned from the disc becomes smaller, so irrespective of phase difference and push/pull, the S/N of the TE signal deteriorates. A lower value of the maximum speed Vmax than in the case of a single layer is therefore set in target speed generating section 140. Also, for the number of tracks for braking NB, a value is set such as to permit deceleration to a speed of movement of the light beam such that pull-in can be performed in a stable fashion on tracking pull-in. This number of tracks for braking NB may be selected not using the above calculation expressions but using a table in accordance with the maximum speed Vmax and number of tracks of movement.

Next, in step S3, switches 129 and 136 are changed over from the solid lines to the dotted lines with the result that tracking control is turned OFF and searching control is turned ON. In step S4, counting of the number of tracks of movement using the output pulse signal of binary conversion circuit 121 is commenced; in step S5, the movement speed Vreal of the light beam is calculated by movement speed detection section 141. In step S6, a determination is made as to whether the number of tracks for movement has become zero or not; if it is not zero, in steps S7~S13, S19, a target speed Vref corresponding to the number of tracks remaining for movement is generated by target speed generating section 140. The method of generating the target speed is described in detail later.

Further, in step S14, linear motor 139 and tracking actuator 132 are driven in accordance with the calculated target speed Vref and the movement speed Vreal. Linear motor 139 is driven by the difference signal of target speed Vref and movement speed Vreal (i.e. it is controlled such that the movement speed coincides with the target speed). Also, tracking actuator 132 is driven by the difference signal between target speed Vref and movement speed Vreal (i.e. it is controlled such that swinging of focusing lens 107 is suppressed).

Steps S5~S14, S19 are repeated until the number of remaining tracks for movement becomes zero. When the number of remaining tracks for movement becomes zero i.e. if the arrival track has been reached, processing shifts from step S6 to step S15 and tracking control is turned ON (switches 129, 136 are changed over from the dotted lines to the solid lines), so that pull-in of tracking can take place. Stable pulling-in of tracking can be achieved by optimum setting of the number of tracks for braking NB and the lens swinging suppression effect during movement. Next, in step S16, the address of the track that has been arrived at is recognized by the address reading circuit 123, and, in step S17, this is compared with the address of the target track and the number of tracks of error is calculated. If the arrival track and the target track are the same, searching is terminated in S18.

If in step S18 an error is found, processing returns to step S2 and retry is effected. At the commencement of retry, the number of tracks for braking NB is reset in accordance with the number of tracks of error. After retry, the address of the arrival track is detected and the number of tracks of error with the target track is calculated. Just as on the first occasion, if the target track and the arrival track are the same, searching is terminated (steps S16, S17, S18). If there is an error, once again the number of tracks for braking NB is reset and retry towards the target track is performed.

Retry is repeated as described above until the target track coincides with the arrival track (i.e. until the number of tracks of error is zero).

Figure 4:
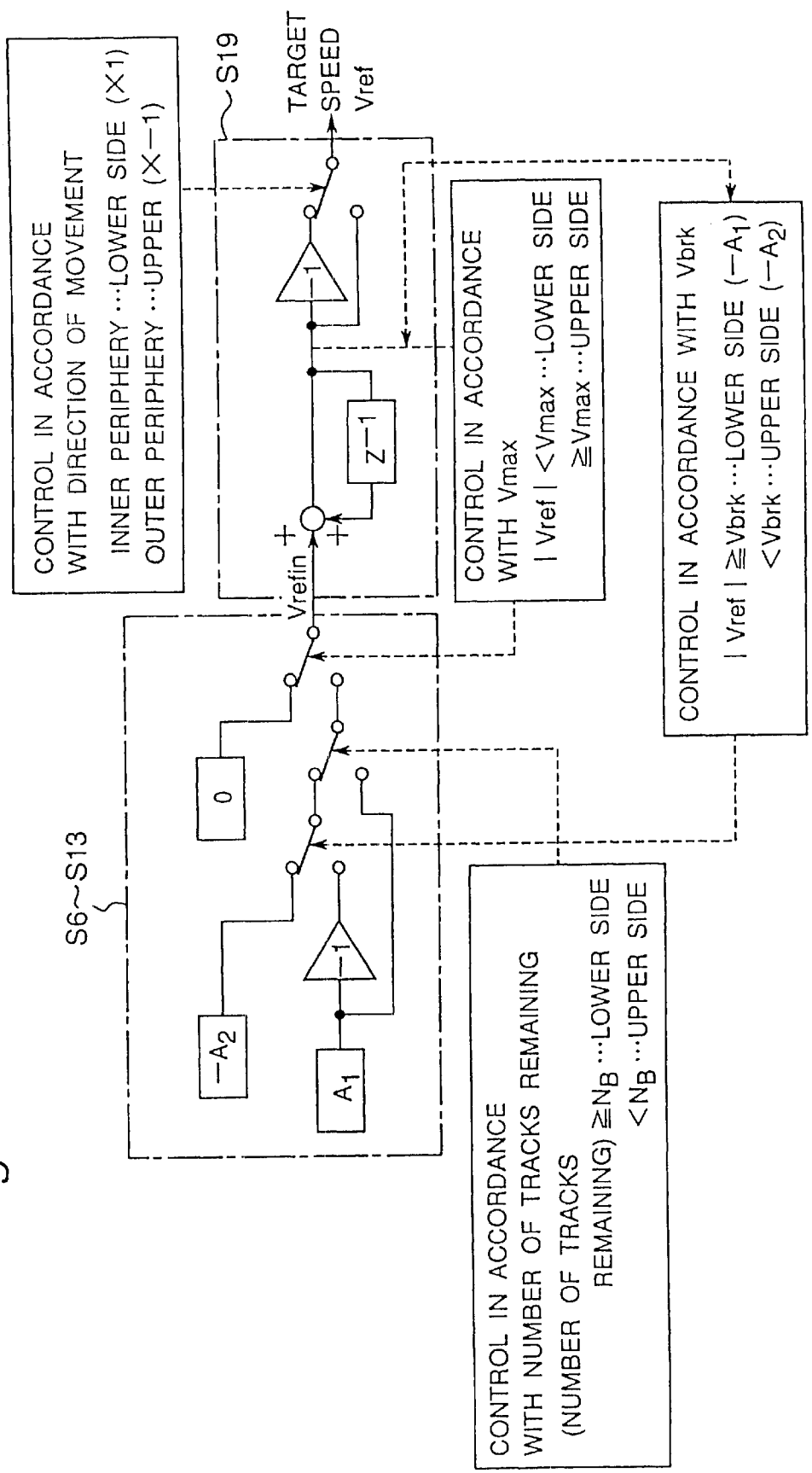
FIG. 4 is a block diagram showing a method of generating a speed profile in this embodiment.

Next, the method of generating target speed Vref will be described in detail. The case where the target speed reaches the maximum speed and the case where it does not reach this are described with reference to FIG. 4 and FIG. 5 taking as example in particular the case where the recording medium is a DVD disc of track pitch 0.74 μm. FIG. 4 is a block diagram showing the method of generating the target speed in target speed generating section 140. This is constructed so as to change over Vrefin, which is the input to the delay device, i.e. so as to change over the acceleration of linear motor 139, in accordance with the number of remaining tracks for movement, |Vref| one sample previous, and the direction of searching. FIG. 5(*a*) shows the speed profile when searching is performed for ⅓ stroke (i.e. when the target speed reaches the maximum speed).

First of all, operation of the target speed generating section 140 when ⅓ stroke searching is performed in the direction of the inner periphery will be described. When searching is commenced, Al is input to Vrefin and linear motor 139 commences movement with a fixed acceleration A1 in the direction of the inner periphery. When |Vref| reaches the set maximum speed Vmax, zero is input to Vrefin and linear motor 139 effects movement with fixed speed Vmax. During searching, the number of tracks of movement is counted using the output pulse signal of binary conversion circuit 121 and a fixed speed Vmax is generated for target speed Vref until the remaining number of tracks for movement reaches the number of tracks for braking NB or less than this.

When the remaining number of movement tracks gets below the number of tracks for braking NB, −A1 is input to Vrefin, and linear motor 139 commences deceleration with a fixed acceleration −A1. Further, when |Vref| gets below gradient alteration speed Vbrk, −A2 is input to Vrefin, causing the acceleration of linear motor 139 to be altered to −A2. Deceleration is continued, and when the remaining number of tracks for movement reaches zero, tracking control is turned ON, and generation of the target speed is terminated. Accordingly, Vref is generated such that the acceleration changes from A1 to zero, from zero to −A1, and from −A1 to −A2. It should be noted that the relationship |−A1|>|−A2| holds.

Figure 5A:
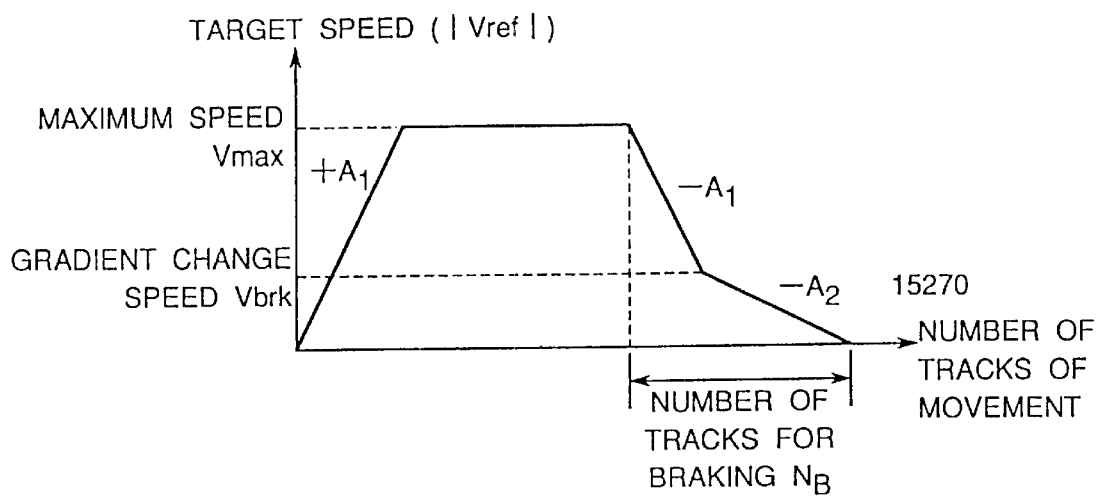
FIG. 5 is a characteristic plot showing a speed profile characteristic in this embodiment.
Figure 5B:
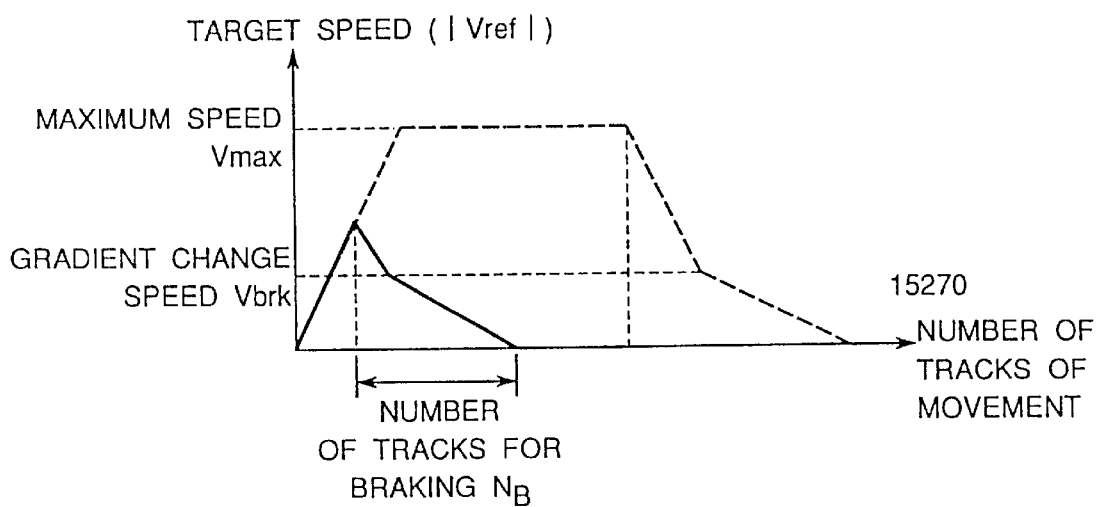

Next, the operation of target speed generating section 140 when a short-distance search is to be performed in the inner circumferential direction will be described with reference to FIG. 5(b). Just as in the case of ⅓ stroke searching, at the commencement of searching, Vref of fixed acceleration Al is generated, causing the linear motor 139 to commence movement towards the inner circumferential direction. In the short-distance case, the number of tracks for movement becomes less than the number of tracks for braking NB before |Vref| reaches the maximum speed Vmax, so a Vref is generated such that the acceleration changes from A1 to −A1 and from −A1 to −A2. Also, when the number of tracks for movement gets even fewer than in FIG. 5(b), |Vref| cannot even reach gradient alteration speed Vbrk, so a Vref is then generated whose acceleration changes from A1 to −A2.

The reason why a smaller value is set for A2 than for A1 is in order to reduce fluctuation of the speed of movement of the light beam on tracking pull-in, thereby enabling stable tracking pull-in to be achieved. (Modified example).

In the method described above, target speed generating section 140 generates a target speed Vref and control is performed using a difference signal with the output signal of movement speed detection section 141 such that the movement speed of the light beam tracks the target speed. However, at the commencement of searching, the ability of the linear motor 139 to track the target speed is adversely affected by the lag in the rise of linear motor 139 with respect to acceleration. Consequently, since the difference between the target speed and the speed of movement is absorbed by tracking actuator 132, focusing lens 107 is always in a displaced condition in the searching direction with respect to the optic axis of the optical head constituted by light source 103 such as a semiconductor laser and four-sector photodetector 109 etc. Furthermore, since a large drive force is applied to tracking actuator 132, under these conditions, focusing lens 107 starts to swing with the first-order resonant frequency of tracking actuator 132. When displacement and swinging of focusing lens 107 occur, the symmetry of the TE signal deteriorates, with the result that binary conversion circuit 121 cannot perform accurate binary conversion. As a result, errors in the number of tracks for movement and errors in the movement speed Vreal that is detected are produced.

Figure 6:
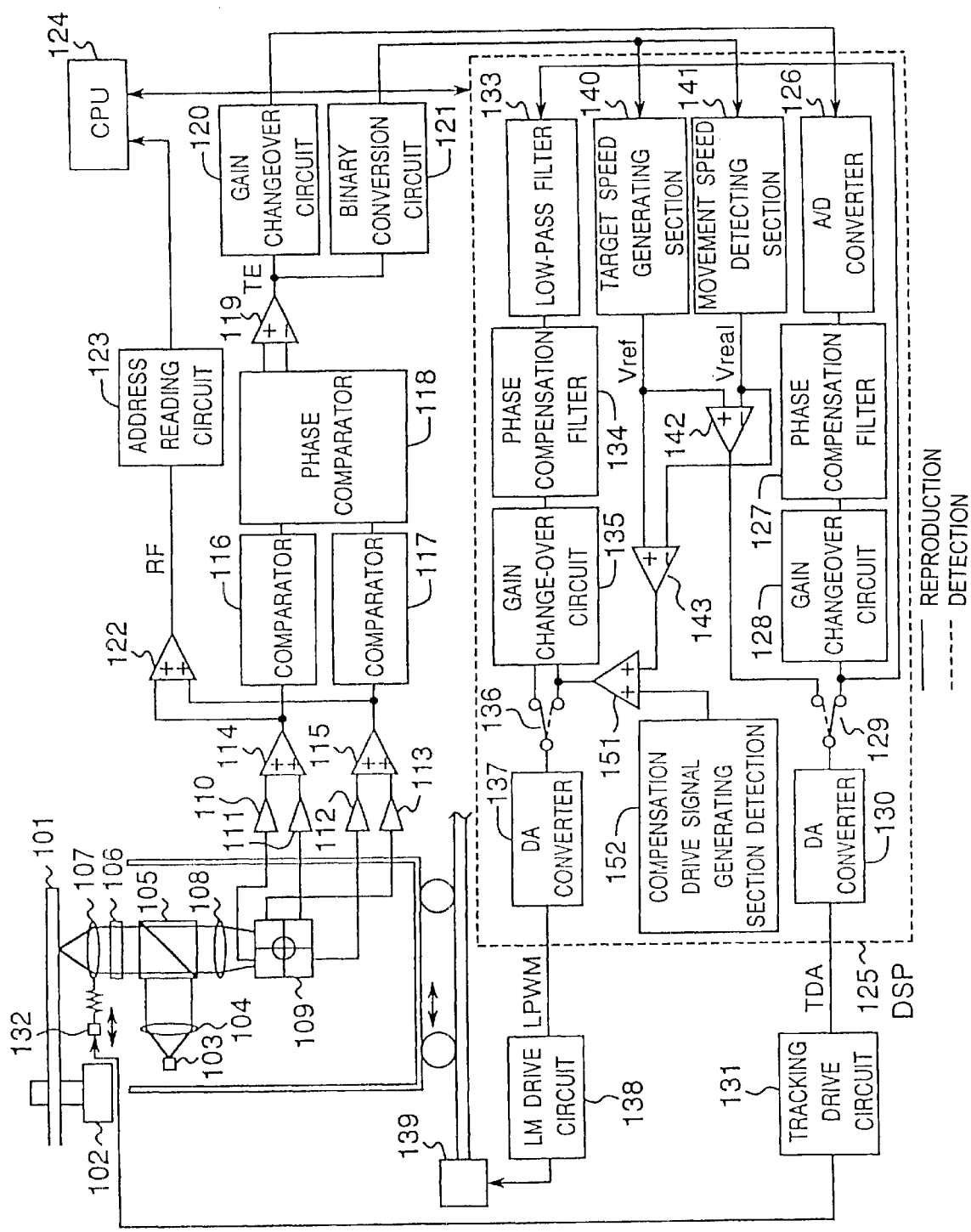
FIG. 6 is a block diagram showing the layout of an optical recording/reproduction device in which feed-forward compensation is performed in the feed control system in this embodiment.

Accordingly, a construction is adopted whereby, as shown in FIG. 6, at the commencement of searching, adding amplifier 151 adds a prescribed drive signal generated in compensation drive signal generating section 152 to the output signal of differential amplifier 143, thereby effecting feed-forward compensation of linear motor 139, forcibly causing it to effect movement by a prescribed amount. The tracking performance of linear motor 139 is thereby improved and displacement and swinging of focusing lens 107 produced at the commencement of searching are suppressed. More stable searching can thereby be achieved.

The ability of linear motor 139 to track the target speed is also impaired during the commencement of deceleration just as during the commencement of searching, owing to the lag in the fall of the linear motor 139 in regard to deceleration. As a result, focusing lens 107 assumes a condition that is displaced in the direction opposite to the searching direction on commencement of deceleration, with respect to the optic axis of the optical head. Furthermore, due to the abrupt deceleration of tracking actuator 132, just as in the case of acceleration, focusing lens 107 starts to swing with the first-order resonant frequency of tracking actuator 132.

Consequently, a construction is adopted whereby, at the commencement of deceleration also, adding amplifier 151 adds to the output signal of adding amplifier 143 a prescribed negative drive signal generated by compensation drive signal generating section 152, so that feed-forward compensation of linear motor 139 is effected, forcibly causing it to effect deceleration. Just as in the case of the commencement of searching, the tracking ability of linear motor 139 is thereby improved, resulting in more stable searching performance being obtained.

Also, since the amount of displacement of focusing lens 107 is controlled to be practically zero prior to commencement of deceleration, if A1, A2 and the gradient alteration speed Vbrk are set such that the time required for deceleration is practically the reciprocal of the first-order resonant frequency of tracking actuator 132, even if swinging of focusing lens 107 were to be produced by an abrupt change of acceleration produced by the deceleration, by the time of tracking pull-in on completion of searching, one full cycle of the first-order resonant frequency would have elapsed i.e. the lens would have practically returned to its original position; the amount of displacement of the focusing lens 107 is therefore practically zero and tracking pull-in can be effected in a stable manner.

A method of improving the pull-in performance of tracking control and of reducing the number of error tracks occurring on the first movement, and a construction therefor in order to further shorten the searching time are described below.

The number of tracks for braking NB is calculated within CPU 124 using the expressions given above, or is stored in a table. However, the sensitivity of linear motor 139 and/or tracking actuator 132 is different for each device and/or changes with time and furthermore variations occur due to factors such as the inclination of the arrangement of the device. Thus, keeping the initial value unaltered may not give the optimum searching speed and cannot guarantee sufficient stability of pull-in of tracking control.

Accordingly, if a construction is adopted whereby on initialization of the device or on replacement of the recording medium movement is effected through a prescribed number of tracks and the expression for the number of tracks for braking NB is corrected or the table values are corrected in accordance with the number of tracks of error from the target track which then result, or the speed of movement Vreal of the light beam on pulling-in of tracking, the number of tracks for braking being set in accordance with this corrected number of tracks for braking, the problem of instability of pulling-in of tracking control due either to the movement speed Vreal failing to be reduced sufficiently, or reverse running being produced by excessive deceleration thus absorbing the variation of sensitivity of linear motor 139 and/or tracking actuator 132 can be solved.

Also, even more stable searching can be achieved if a construction is adopted whereby correction (learning) of the number of tracks for braking is performed during searching that is conducted after device start-up. A learning algorithm for the number of tracks for braking NB is described in detail below with reference to the flow charts of FIG. 7 and FIG. 8.

Figure 7:
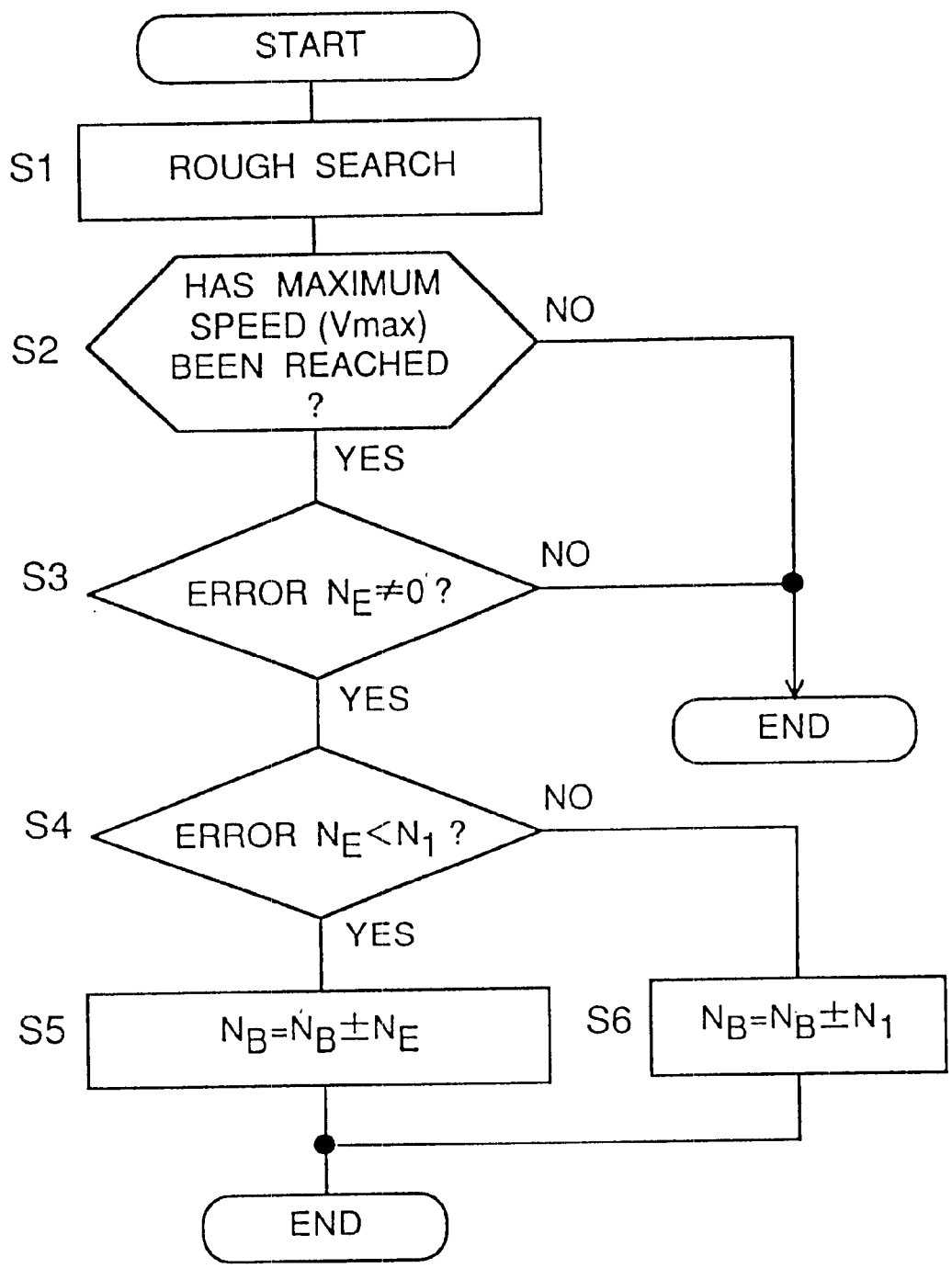
FIG. 7 is a flow chart showing the flow of processing of learning of number of tracks of braking using the number of tracks of error in this embodiment.

FIG. 7 is a flow chart for the method of correcting the number of tracks NB for braking in accordance with the number of tracks of error from the target track on completion of the first movement (on completion of rough searching). First of all, rough searching is performed in step S1. Next, as shown in FIG. 5(a), since, at the number of tracks for movement at which the maximum speed Vmax is reached, the number of tracks NB for breaking is a fixed value, in step S2, a determination is made, from the value of the number of tracks NB for braking that was set during rough searching, as to whether or not this rough search constituted a number of tracks for movement within which the maximum speed Vmax would be reached. If the maximum speed Vmax is not reached, the learning algorithm is terminated without correcting the calculation expression or table values for the number of tracks NB for braking. If the maximum speed Vmax is reached, in steps S3, S4, S5 and S6, the number of tracks NB for braking is corrected in accordance with the target track and the number of tracks of error NE, and, in subsequent rough searching in which maximum speed Vmax is reached, this corrected number of tracks for braking is set. The reason why, if, in steps S4 and S6, the number of tracks of error NE exceeds a certain set value N1 (for example 20 tracks), the extent of the correction is restricted to N1 is in order to prevent spurious correction (spurious learning) due to errors caused by miscounting due for example to vibration or shock applied to the device during deceleration or to disc damage.

The number of times that the target track is overrun and the error NE is more than N1 is counted and if this count exceeds a prescribed value, it is concluded that under-counting takes place at the maximum speed Vmax of target speed Vref generated by target speed generating section 140, so in subsequent searching the maximum speed Vmax is set lower. This set value is suitably made such that the search time, including retries, resulting from reduction in the number of error tracks, is shorter than the amount of increase in time required for the first movement.

Figure 8:
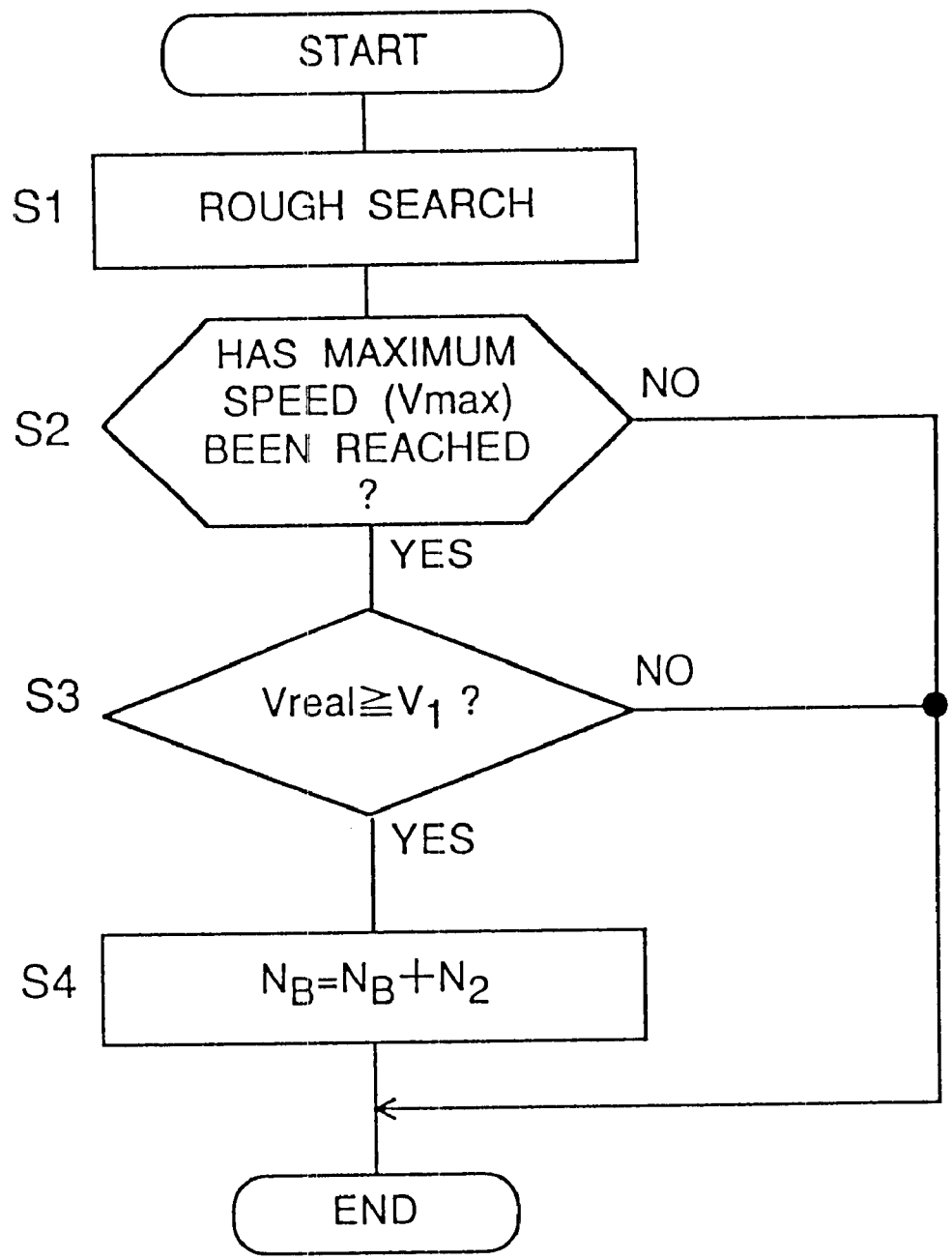
FIG. 8 is a flow chart showing the flow of processing of learning of number of tracks of braking using movement speed in this embodiment.

FIG. 8 is a flow chart for a method of correcting the number of tracks NB for braking by using the movement speed Vreal of the light beam on completion of rough searching. The operation in steps S1 and S2 is the same as in the case where correction is performed in accordance with the number of tracks of error from the target track, so further description thereof is omitted. In steps S3 and S4, if the speed of movement Vreal of the light beam on completion of rough searching is above a set value V1, the number of tracks NB for braking is corrected by a given set value N2. V1 is set to about 50% of the upper limit of the speed of movement for which stable tracking pull-in is possible.

Just as in the case of the method in which the number of tracks for braking is corrected in accordance with the number of tracks of error as described above, the number of times the speed of movement Vreal exceeds V1 is counted and if this count exceeds a prescribed value, in subsequent searching, the maximum speed Vmax is set lower. Stable searching can thereby be achieved and searching time reduced.

It should be noted that although two methods of correcting the number of tracks for braking have been described separately, stability of searching could be even further improved by combining these two methods.

Also, if, when performing searching in the vicinity of the inner periphery and outer periphery of optical disc 101, the number of tracks for braking is set to be somewhat more (about ten tracks more) than the number of tracks for braking NB that would ordinarily be set, the situation of focus control being lost by running off into the no-track region because of mis-counting, due to damage etc., of the number of tracks for movement effected using the output pulse signal of the binary conversion circuit 121 can be prevented from occurring.

Furthermore, although the speed of movement Vreal, as already described, is calculated from the pulse width or pulse separation of the output pulse signal of binary conversion circuit 121 in movement speed detection section 141, due for example to noise generated on conversion to binary form of the TE signal and/or damage on optical disc 101, it may happen that a value that is considerably different from the originally anticipated pulse width or pulse separation is input to movement speed detection section 141. There is a risk of destabilizing searching if linear motor 139 and tracking actuator 132 are driven by performing speed detection using such values. Accordingly, if the detected pulse width or pulse separation exceeds a prescribed range with respect to that detected on the previous occasion, speed detection is not performed using this value and speed detection is performed using instead a value as described below. Instability of searching due to spurious speed detection can thereby be prevented.

When performing movement with fixed speed at maximum speed Vmax, the originally fixed pulse width or pulse separation are input to movement speed detection section 141, so, if the prescribed range is exceeded, linear motor 139 and tracking actuator 132 are driven using speed detection performed using the values detected on the previous occasion. The range for such decision may be set for example to under ⅕ and over twice the previously detected value; if the value is under ⅕, this may be concluded to be due to noise or damage, while if the value is more than twice, this may be concluded to be due to failure of the conversion to binary form of the TE signal by binary conversion circuit 121. Also, since the accelerations during acceleration and deceleration are fixed, the pulse width or pulse separation that ought properly to be input to movement speed detection section 141 can be deduced from the value that was previously detected, and linear motor 139 and tracking actuator 132 driven by performing speed detection using this deduced value. To allow for some degree of variation due to acceleration/deceleration, this range for such decision may be set for example below ⅛ and above three times.

It should be noted that if the detected pulse width or pulse separation are outside the prescribed range for decision successively more than a prescribed number of times (for example five times), the conclusion is drawn that this represents an abnormal condition such as out-of-focus, and drive of linear motor 139 and tracking actuator 132 is forcibly terminated.

Although a first embodiment of the present invention has been described above, the present invention is not restricted in any way by the system for feeding the optical head and could be applied for example to gear feed using a DC motor instead of a linear motor or to a feed system using a stepping motor (linear pulse motor). Also, as the method of detecting the TE signal, apart from the phase difference method as in the present embodiment, the push-pull method or three-beam method etc. are available, but the present invention is not restricted in any way to these and could be applied to any detection method.

(Second embodiment)

Figure 9:
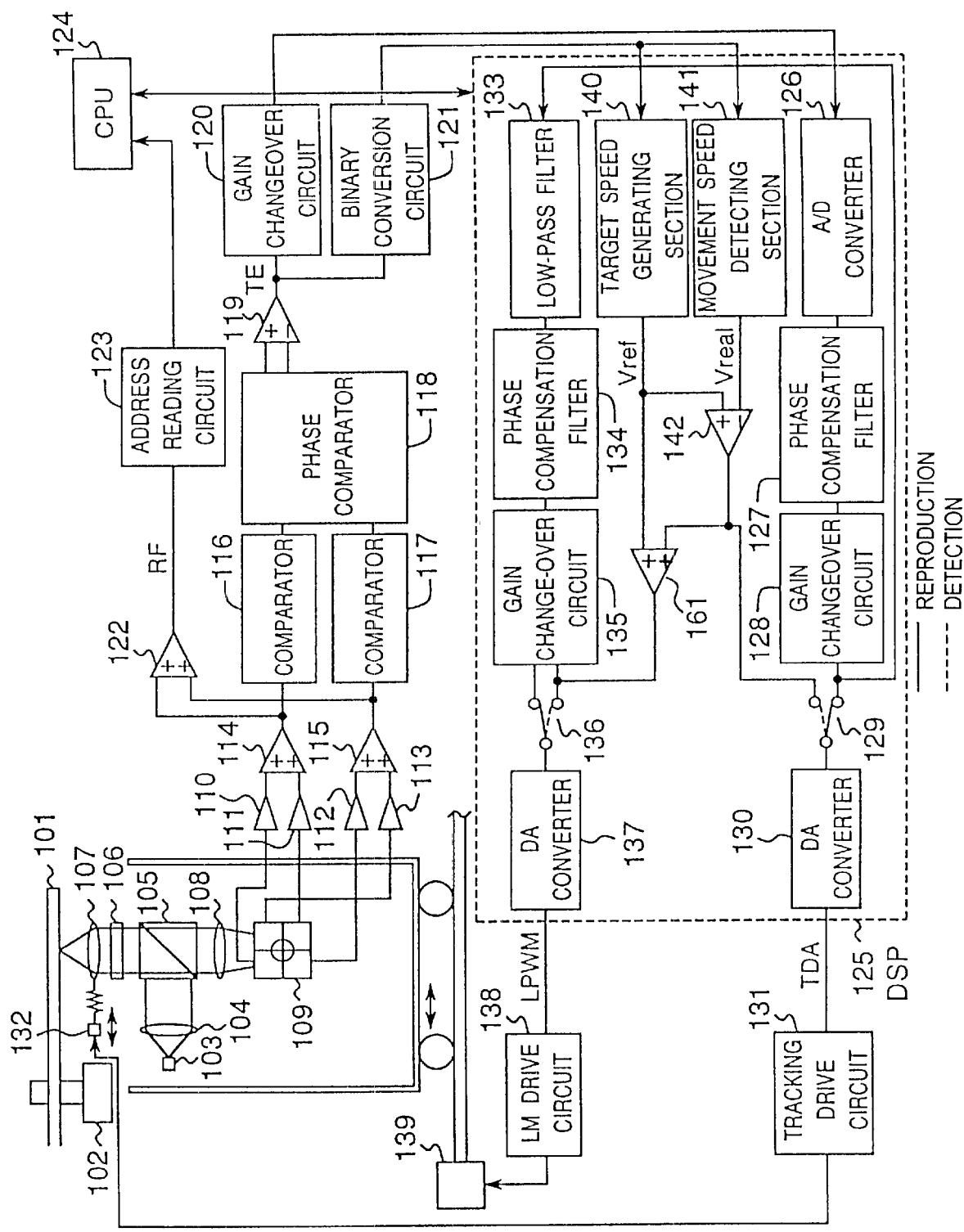
FIG. 9 is a block diagram showing the layout of an optical recording/reproduction device according to a second embodiment of the present invention.

Next, a second embodiment will be described. FIG. 9 is a block diagram showing the layout of an optical recording/reproducing device according to a second embodiment of the present invention. Parts corresponding to the first embodiment are given the same reference symbols and further description thereof is omitted.

The second embodiment can be implemented by altering the drive method of the movement control system during searching of the layout of the first embodiment shown in FIG. 1. In the first embodiment, differential amplifier 143 was constructed such that the target speed Vref generated by target speed generating section 140 and the movement speed Vreal of the light beam detected by the movement speed detecting section were respectively suitably amplified, their difference signal output, and linear motor 139 driven using the output signal of differential amplifier 143, but, in this second embodiment, adding amplifier 161 is constituted such that it outputs the sum signal of the output signal (error signal of Vref and Vreal) of differential amplifier 142 and target speed Vref, and linear motor 139 is driven using this sum signal.

The method of searching in the second embodiment and the method of generating the target speed Vref are the same as in the first embodiment, so further description thereof is omitted.

Also, just as in the first embodiment, if a construction is adopted in which an adding amplifier 151 and compensating drive signal generating section 152 are added as shown in FIG. 6, so that linear motor 139 is forcibly accelerated/decelerated by a prescribed amount by feed-forward compensation, the tracking capability of linear motor 139 can be improved and displacement and swinging of focusing lens 107 produced at the commencement of searching or at the commencement of deceleration can be suppressed, enabling stable searching performance to be obtained.

(Third embodiment)

Figure 10:
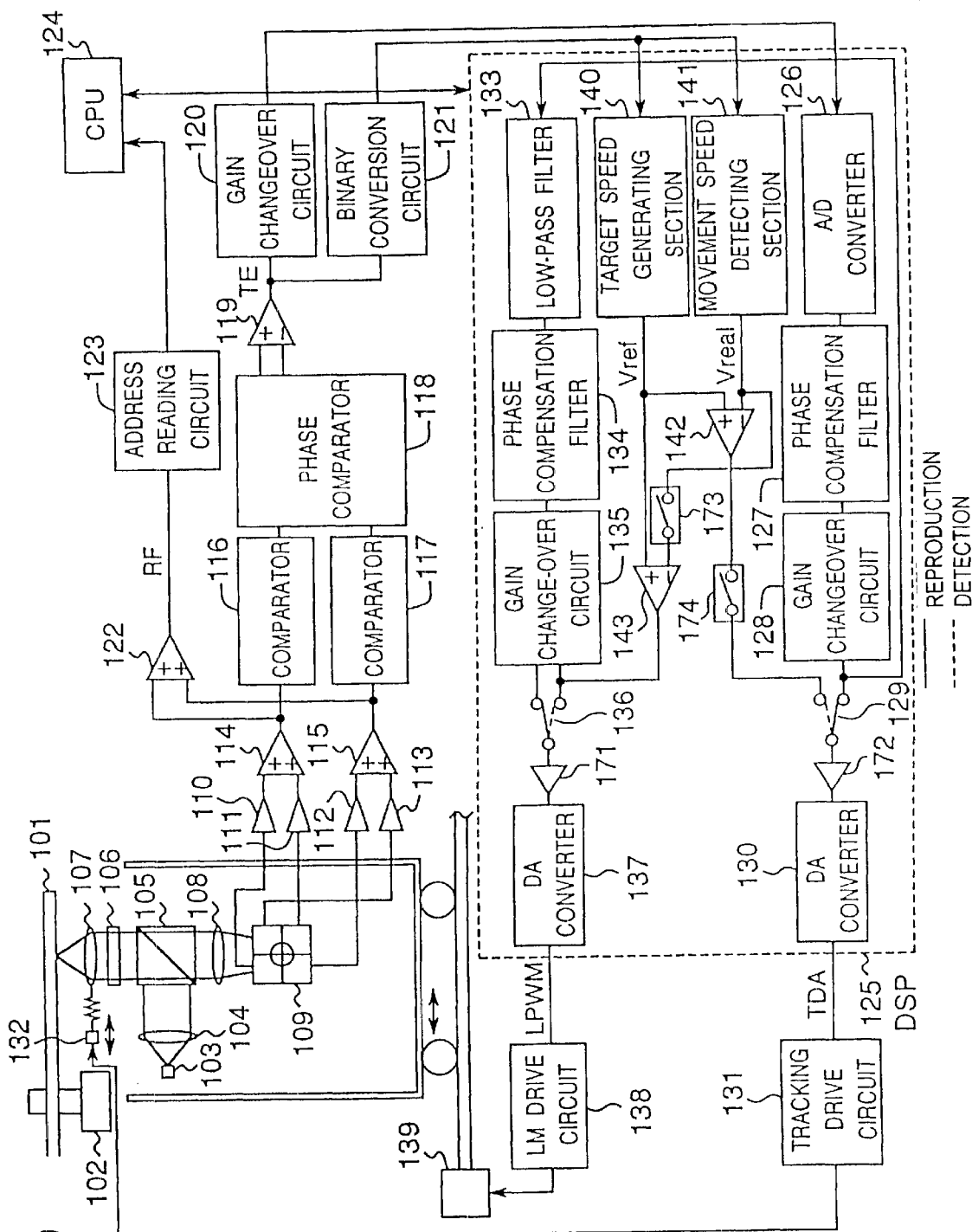
FIG. 10 is a block diagram showing the layout of an optical recording/reproduction device according to a third embodiment of the present invention.

Next, a third embodiment will be described. FIG. 10 is a block diagram showing the layout of an optical recording/reproducing device according to a third embodiment of the present invention; parts corresponding to the first embodiment are given the same reference symbols and further description thereof is omitted.

The third embodiment may be implemented by adding the following to the construction of the first embodiment shown in FIG. 1. The items added are: a multiplier 172 for setting a value such that the loop gain becomes a prescribed value after switch 129 that performs opening/closing operation of the loop of the tracking control system and changeover operation of the drive signal of tracking actuator 132 between tracking control and searching; a multiplier 171 that amplifies or attenuates the output signal of switch 136 that changes over the drive signal of linear motor 139 between feed control and searching; a switch 173 that switches on or off the inverse phase input signal of differential amplifier 143; and switch 174 that switches on or off the output signal of differential amplifier 142.

Owing to variability of sensitivity due to variability between devices or variability due to change over time, the movement distance and movement speed of linear motor 139 show variability even though the same drive signal is output by linear motor drive circuit 138. The sensitivity of tracking actuator 132 also shows variability due to variability between devices or change over time with the result that the loop gain of the tracking control system fluctuates even if the same drive signal is output by tracking drive circuit 131. Due to this variability of sensitivity, searching becomes unstable and the searching error with a desired track increases. In this third embodiment, the set values of the respective multipliers 171, 172 are therefore changed over in accordance with the sensitivity of linear motor 139 and the tracking actuator 132.

In multiplier 171, if the sensitivity of linear motor 139 is high, a small value is set and, on the contrary, if the sensitivity is low or if the sensitivity has fallen due to change over time, a large value is set. And in multiplier 172, a value is set such that the loop gain of the tracking control system is a prescribed value.

The method of setting multipliers 171 and 172 is described below with reference to the flow chart of FIG. 11 which shows the flow of processing on start-up of the device.

Figure 11:
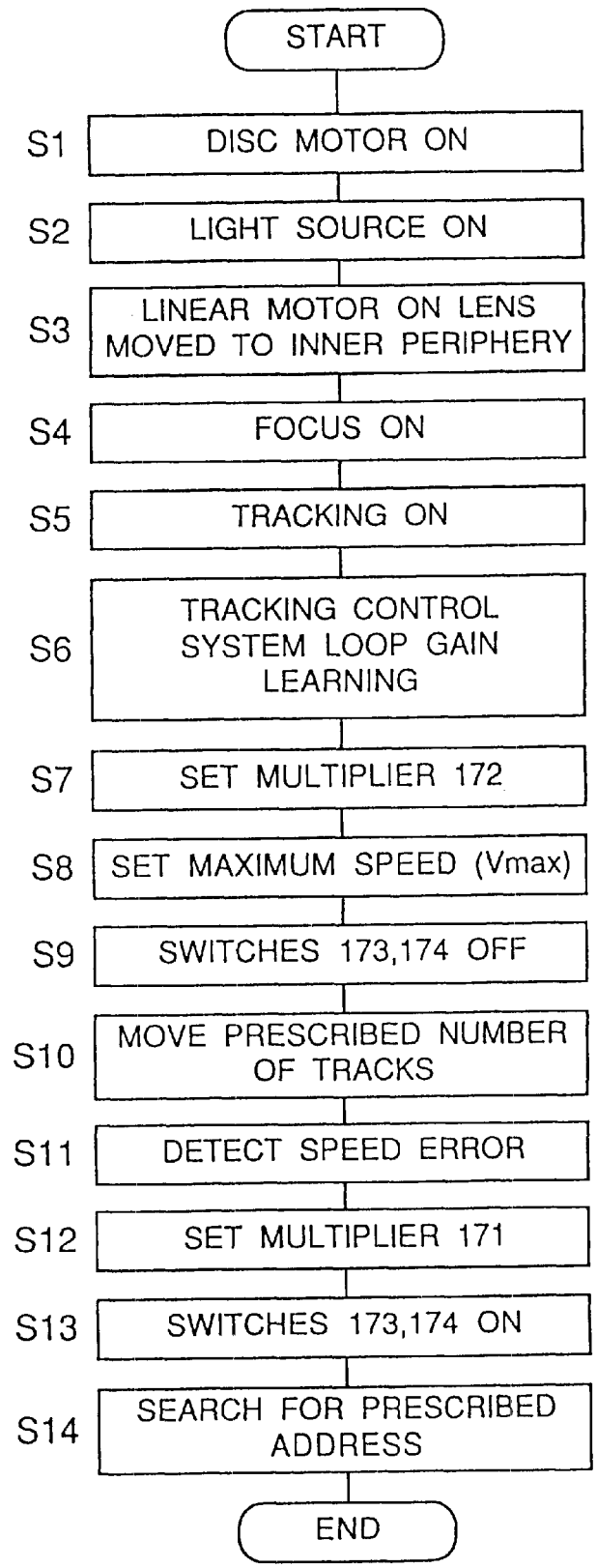
FIG. 11 is a flow chart showing the flow of processing on start-up of a device according to this embodiment.

As shown in FIG. 11, when the power source of the device is turned ON, in step S1, optical disc 101 is rotated by disc motor 102. When optical disc 101 reaches a prescribed speed of rotation, in step S2, the light source 103 such as a semiconductor laser emits light. Next, in step S3, linear motor 139 is actuated, causing focusing lens 107 to move towards the inner periphery of optical disc 101. Next, in step S4, focus control is commenced by driving the focus actuator (not shown) and, in step S5, tracking control is commenced by driving tracking actuator 132.

Next, in step S6, the transfer function is found by applying a prescribed external disturbance to the tracking control system by software processing within DSP 125 in order to detect its single-cycle transfer signal function, and the corrected value of the loop gain of the tracking control system is thereby calculated. In step S7, a set value corresponding to the corrected value is set in multiplier 172.

Furthermore, in step S8 to step S11, switches 173 and 174 are turned OFF and the maximum speed Vmax such that the focusing lens 107 does not swing even though control is not applied to tracking actuator 132 is set, and linear motor 139 is moved by a prescribed number of tracks. At this point, the error between the maximum speed of movement detected by movement speed detection section 141 and the maximum speed Vmax set in step S8 is calculated and, in step S12, a set value corresponding to this error is set in multiplier 171.

Finally, in step S13, switches 173 and 174 are turned ON, and, in step S14, the prescribed address is searched for and set-up of the device is completed.

By means of the setting of the multipliers 171, 172 described above, the sensitivity variability of linear motor 139 and tracking actuator 132 can be absorbed, enabling searching to be performed in a stable manner.

(Fourth embodiment)

Figure 12:
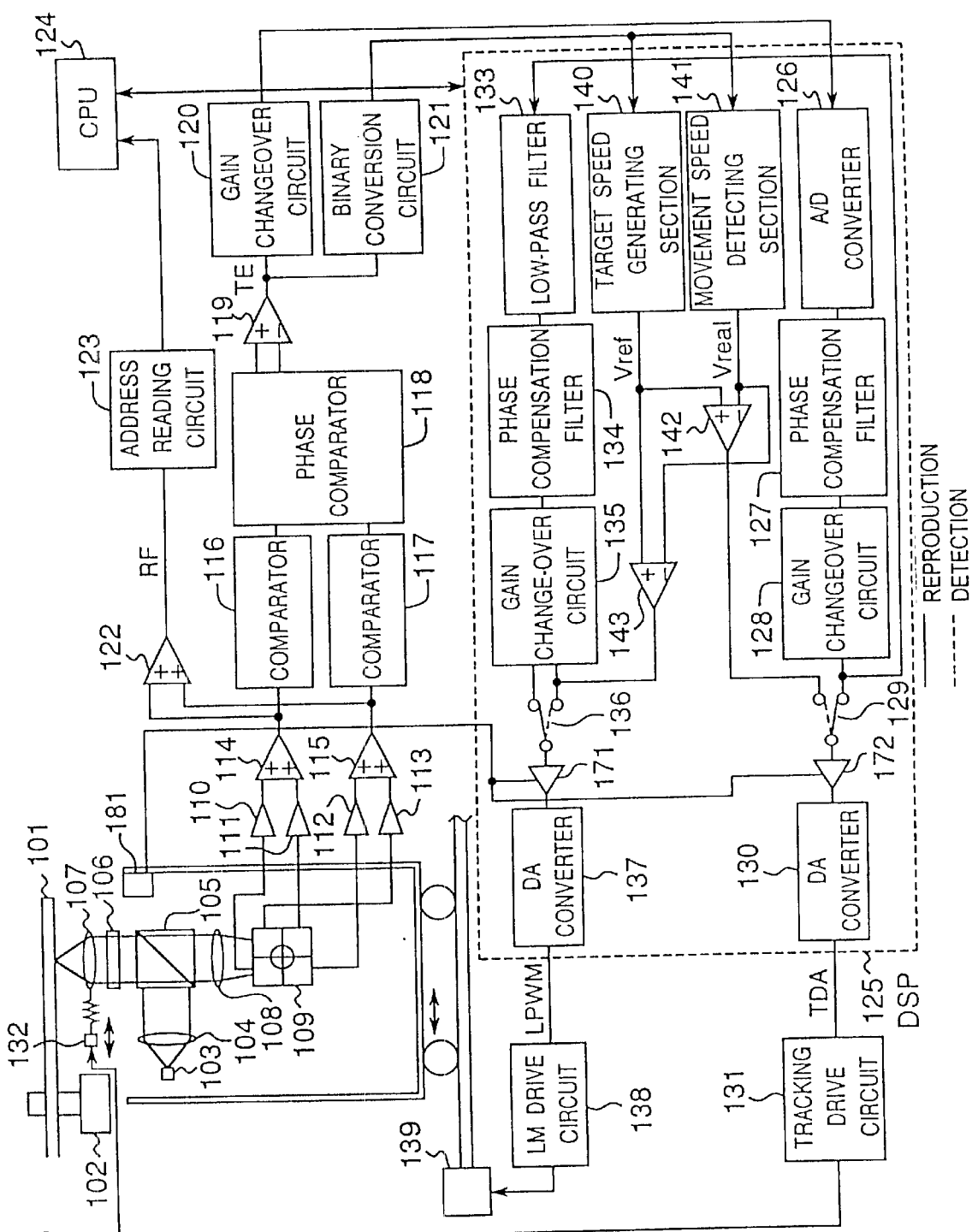
FIG. 12 is a block diagram showing the layout of an optical recording/reproduction device according to a fourth embodiment of the present invention.

Next, a fourth embodiment is described. FIG. 12 is a block diagram showing the layout of an optical recording/reproducing device according to a fourth embodiment of the present invention. Parts corresponding to the first and third embodiments are given the same reference symbols and further description thereof is omitted.

In the fourth embodiment, switches 173 and 174 are deleted from the construction of the third embodiment shown in FIG. 10 and a temperature sensor 181 that detects the temperature within the device is added to the frame of the device in which the linear motor 139 and tracking actuator 132 are mounted. The detected temperature of temperature sensor 181 is input to an AD converter (not shown) in DSP 125, and DSP 125 is thereby able to detect the temperature within the interior of the device, in particular the temperature in the vicinity of linear motor 139 and tracking actuator 132.

When the temperature within the interior of the device rises or falls, the movement speed of the light beam during searching fluctuates due to sensitivity variability of linear motor 139 and tracking actuator 132 resulting from the temperature change; this makes searching unstable and increases searching error with respect to the desired track. In this fourth embodiment, the set values of multipliers 171 and 172 are therefore changed over in response to the temperature detected by temperature sensor 181.

When the temperature within the interior of the device rises, the sensitivity of linear motor 139 rises, so linear motor 139 moves with a higher speed than the target maximum speed that is set by target speed generating section 140. When the speed rises too far, due to the frequency characteristic of the binary conversion circuit 121, the TE signal can no longer be accurately converted into binary form, so the number of tracks of error with respect to the desired track increases. Also, due to the rise in sensitivity of tracking actuator 132, more than the necessary control comes to be applied, with the result that the control that is intended to suppress swinging of focusing lens 107 during movement of the light beam in fact provokes swinging. Accordingly, by reducing the set values of multipliers 171 and 172 in response to the detected temperature by temperature sensor 181, the movement speed and swinging of focusing lens 107 can be suppressed, making it possible to achieve stable pull-in of tracking to the target track.

Also, when the temperature within the interior of the device drops, the sensitivity of linear motor 139 drops, so linear motor 139 moves with a speed that is slower than the target speed set by target speed generating section 140, with the result that the searching time increases. Also, owing to the drop in sensitivity of tracking actuator 132, it becomes unable to suppress swinging of focusing lens 107, with the result that pull-in of tracking becomes unstable. Accordingly, by increasing the set values of multipliers 171 and 172 in accordance with the detected temperature obtained by temperature sensor 181, stable tracking pull-in to the target track can be achieved in a prescribed search time.

(Fifth embodiment)

Figure 13:
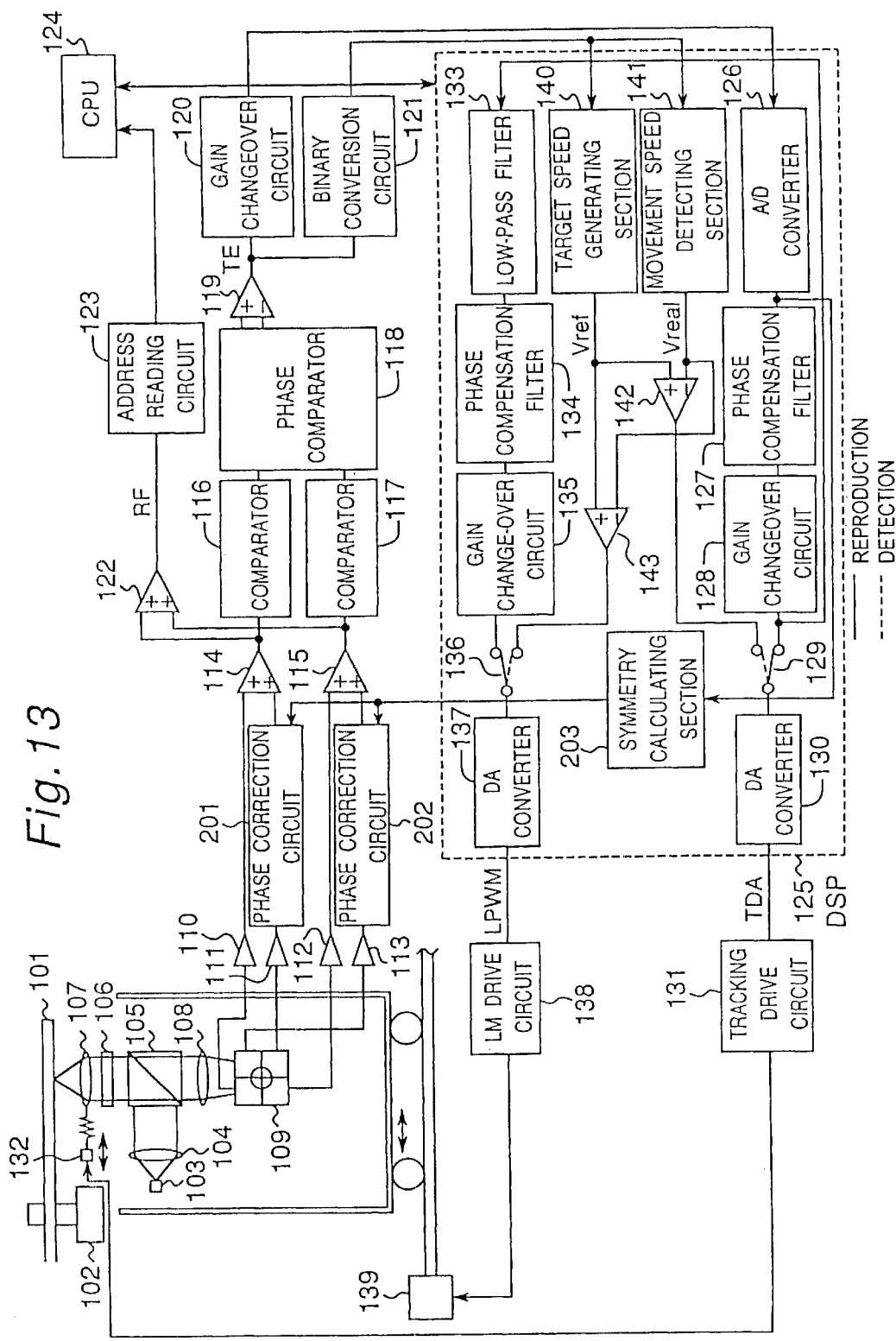
FIG. 13 is a block diagram showing the layout of a tracking error signal generating section of an optical system recording/reproducing device according to a fifth embodiment of the present invention.

Next, a fifth embodiment is described with reference to the block diagram of FIG. 13. In FIG. 13, in the track error signal (TE signal) generating section of FIG. 1, there are added phase correction circuits 201, 202 that advance or delay the phase of the output signals of pre-amplifiers 111, 113. Parts corresponding to FIG. 1 are given the same reference symbols and further description thereof is omitted. It should be noted that phase correction circuits 201, 202 are inserted after pre-amplifiers 111, 113 so as to advance or delay the phase of the signals output from the two divided regions, corresponding to radially inner and outer portions, of optical disc 101, of the four photodetection regions of four-sector photodetector 109.

In the present invention, the phase difference method is adopted as the method of detection of the TE signal. While the phase difference method has the advantage that it makes possible detection of track error with high sensitivity where there are different track pitches as in DVD discs or CD discs, it is subject to the problem that if the focusing lens 107 gets displaced (lens shift) with respect to the optic axis of the optical head, error is produced, which has an adverse effect on symmetry of the TE signal. As already described, if the symmetry of the TE signal deteriorates, this causes miscounting in binary conversion circuit 121 on searching as well as deterioration of the tracking pull-in performance after completion of movement. The principles governing the occurrence of error are not directly related to the present invention and a description thereof will therefore be omitted. Regarding the amount of this error, as shown in FIG. 14, it is found that at fixed speed of rotation it is practically proportional to the amount of displacement of focusing lens 107 (lens shift), and is practically inversely proportional to the rotational speed.

As shown in FIG. 13, error of the TE signal produced by lens shift can be removed by using phase correction circuits 201, 202 to adjust the phase of the signal that is output from two divided regions, corresponding to a radially inner and a radially outer portion of optical disc 101, of the four photo-detection regions of four-sector photodetector 109 (i.e. by advancing or delaying this phase).

In the case of fixed rotational speed reproduction (CLV reproduction), by software processing within DSP 125 at device start-up, tracking actuator 132 is driven so that focusing lens 107 is forcibly moved in the direction of the inner periphery or outer periphery of optical disc 101, and the degree of symmetry of the TE signal when this is done is then measured, and a phase correction amount such that the symmetry is optimum is determined. By this means, a reduction in mis-counting by the binary conversion circuit 121 due to swinging of the focusing lens 107 when searching, and an increase in tracking pull-in performance on termination of searching can be achieved.

Figure 14:
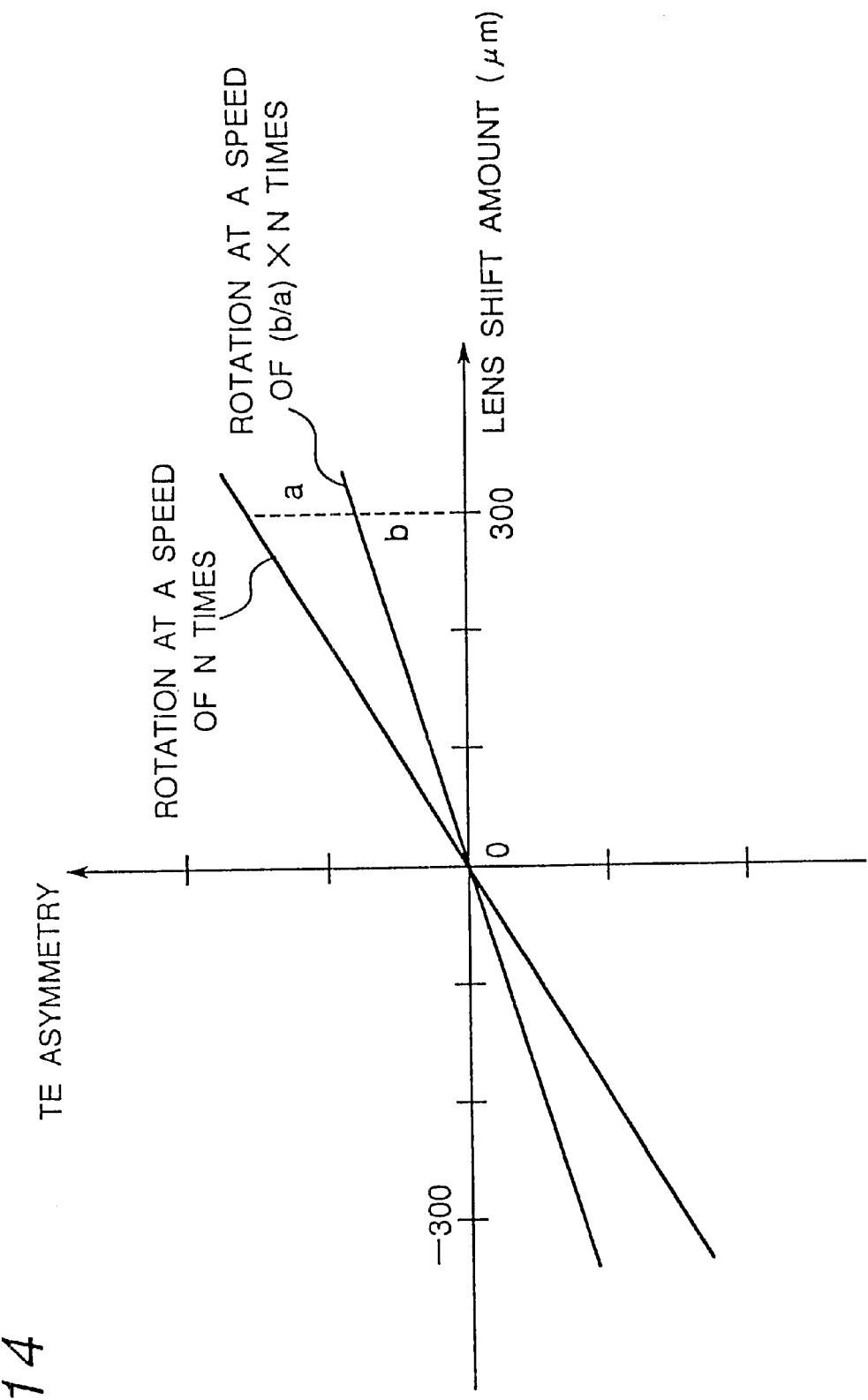
FIG. 14 is a diagram showing the asymmetric relationship of tracking error signals with respect to amount of lens shift in this embodiment.

In contrast, in the case of fixed rotational speed reproduction (CAV reproduction), although the phase correction amount determined by the method described above on device start-up is the correction amount for which the symmetry of the TE signal is best, at the position of the optical head at which adjustment was effected, the rotational speed changes when the optical head moves, so the correction amount for which the TE signal is best at the movement destination is different from the phase correction amount determined on device start-up, as shown in FIG. 14. A method for solving this problem is described below.

Let the phase correction amount determined on device start-up be Nstart, and the rotational speed at the position of the optical head at this time be Vstart. If the phase correction amount for which the symmetry of the TE signal is best at the target track during searching is N and the speed of rotation at the target track is V, the speed of rotation V can be calculated by CPU 124 from the address of the target track. Also, since, as shown in FIG. 14, the phase correction amount is practically inversely proportional to the speed of rotation, the phase correction amount N at the target track is a value obtained from the calculation formula: Nstart× Vstart/V. The problem of tracking pull-in becoming unstable due to error of the TE signal produced due to an inappropriate phase correction amount is ameliorated by performing searching with the phase correction amount N set at a prescribed track count, for example simultaneously with the setting of the number of tracks NB for braking and the maximum speed Vmax in steps S1 and S2 of the algorithm of FIG. 3.

Furthermore, even in the case of CLV control, if the response of the disc motor is insufficient due to speeding up of the reproduction speed, a construction may be adopted in which the speed of rotation, which changes in accordance with the track count in the same way as in CAV control is inferred in accordance with the characteristic of the motor that is employed, and the phase correction amount N is set corresponding to this speed of rotation.

(Sixth embodiment)

Figure 15:
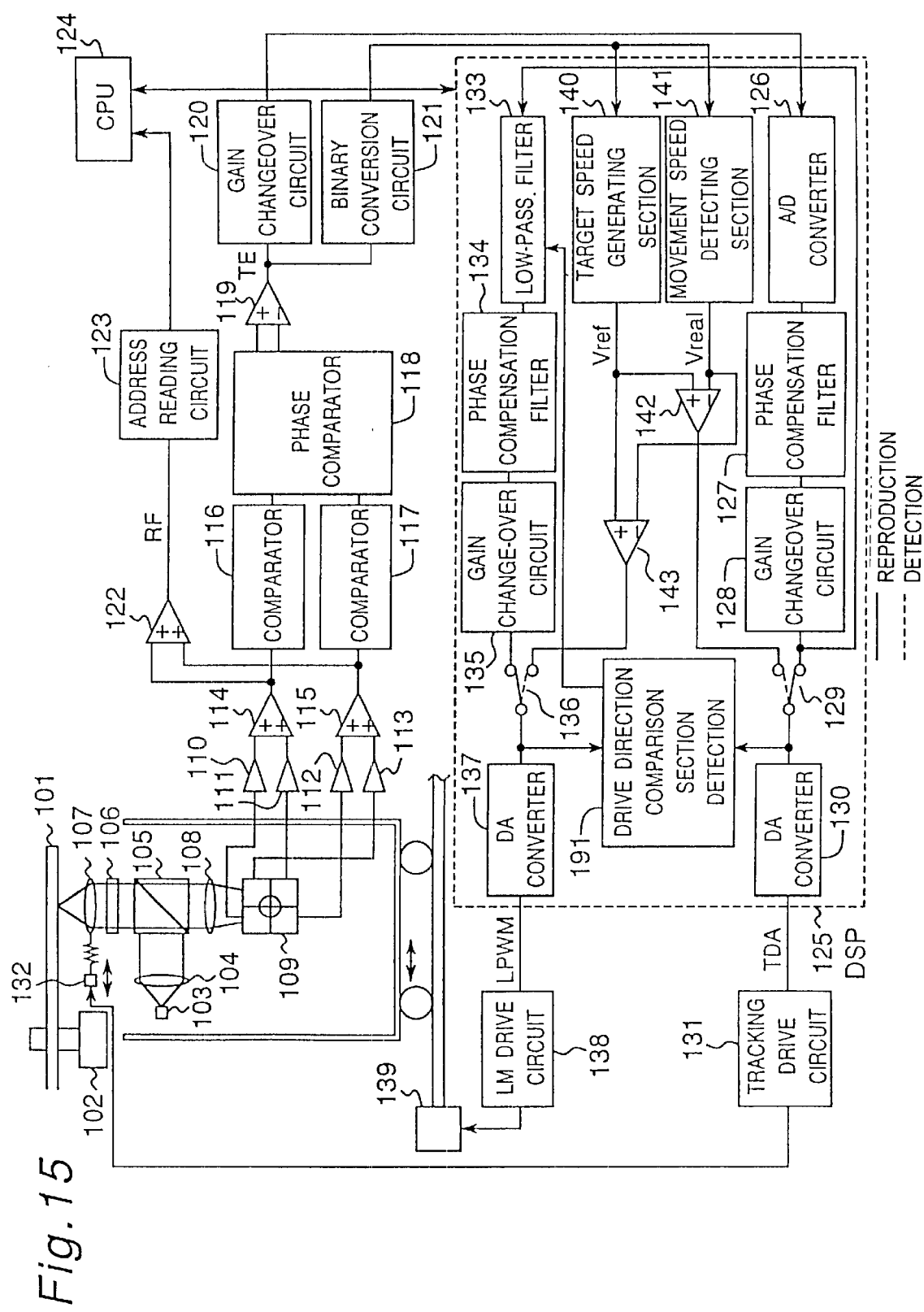
FIG. 15 is a block diagram showing the layout within a DSP of an optical recording/reproduction device according to a sixth embodiment of the present invention.

A sixth embodiment will now be described with reference to the block diagram of FIG. 15 in addition to the block diagram of FIG. 1. FIG. 15 is a block diagram showing the layout within DSP 125 of the feed control system and the tracking control system during tracking control. Parts corresponding to FIG. 1 are given the same reference symbols and further description thereof is omitted. In tracking control, the tracking ability of linear motor 139 is poor and if movement control is performed in a condition with focusing lens 107 displaced with respect to the optic axis of the optical head, symmetry of the TE signal at the start of searching is poor so conversion to binary form cannot be performed accurately by binary conversion circuit 121, with the result that error occurs in the number of tracks to be moved. Accordingly, this fifth embodiment relates to improvements in the tracking ability of linear motor 139 during tracking control.

As described in the first embodiment, during tracking control, the noise in the TE signal that has passed through the gain changeover circuit 128 is removed by restricting its frequency bandwidth; in addition, it is subjected to phase compensation. Feed control is then performed using this signal.

Since the directions of the drive signals that are applied to tracking actuator 132 and linear motor 139 are both in the spiral direction of the recording medium, but, when the drive signal applied to the linear motor 139 is lower than the voltage required to start movement of linear motor 139, tracking control is performed solely by the tracking actuator 132, focusing lens 107 is gradually displaced in the spiral direction with respect to the optic axis of the optical head. When, in a short while, the drive signal applied to linear motor 139 exceeds the voltage for starting movement, linear motor 139 starts to move in the spiral direction and, as this takes place, the drive signal applied to the tracking actuator 132 gradually diminishes, with the result that the displacement of focusing lens 107 also gradually diminishes. However, even at the time-point where the optical system has moved as far as the neutral point of the spring of tracking actuator 132, some drive signal is still applied in the spiral direction to linear motor 139 owing to the delay element of the feed control system and if this is higher than the voltage for starting movement, linear motor 139 is moved further in the spiral direction, with the result that focusing lens 107 is displaced in the opposite direction to the spiral direction and, when this movement goes too far, jumps off the track.

Accordingly, as shown in FIG. 15, a construction is adopted whereby the direction of the drive signal applied to tracking actuator 132 and the direction of the drive signal applied to linear motor 139 are compared in drive direction comparison section 191, and the time-point where the direction of the drive signal applied to linear motor 139 becomes opposite to the direction of the drive signal applied to tracking actuator 132 is detected by software processing of DSP 125, and, at this instant, the content of the delay device of low-pass filter 133 that constitutes the phase control system is initialized (cleared). This enables linear motor 139 to be driven without hesitation in the direction in which braking is applied, since there is no possibility of overrunning in the spiral direction. Tracking performance is thereby improved and high precision feed control can be implemented.

In addition, it is arranged to be possible for the constants of the multipliers that constitute the low-pass filter 133 and phase compensation filter 134 to be set in accordance with the speed of rotation of the recording medium, and for their frequency characteristics to be changed over. For example, stable feed control can be implemented by altering the cut-off frequency of low-pass filter 133 by setting the constant of the multiplier for standard-speed reproduction and six-fold speed reproduction when for example the recording medium is a CD disc.

The construction is also such that the frequency characteristics can be changed over by setting the constants of the multipliers that constitute low-pass filter 133 and phase compensation filter 134 in accordance with the track pitch of the recording medium. For example, stable feed control can be implemented by setting, in the multiplier that constitutes phase compensation filter 134, constants such as to enable respectively optimum phase compensation to be performed in the case where the recording medium is a DVD disc of track pitch 0.74 $\mu$m and in the case where it is a CD disc of track pitch 1.6 $\mu$m.

Although the present invention has been described in detail above, the present invention need not be restricted to the respective embodiments, and an optical recording/reproducing device providing searching of better stability and high reliability as well as high-precision feed control can be implemented by combining these respective embodiments.

Also, although the present invention was described using a digital signal processor, it could of course be implemented using analog circuitry.

As described above, by means of the present invention, an optical recording/reproducing device can be provided wherein swinging of the lens during searching can be suppressed and high tracking pull-in performance ensured without adding a speed sensor to the device, by driving the tracking actuator using the error signal of the target speed and the movement speed of the light beam, and wherein the movement speed of the focusing lens is controlled during searching even if there are fluctuations of drive sensitivity of the tracking actuator and traverse motor due to change over time or temperature change, thereby enabling fast and stable searching performance to be obtained with low cost.

Also, during tracking control, by comparing the direction of the drive signals applied to the traverse motor and tracking actuator, and clearing the content of the delay device of the low-pass filter comprised in the feed control system at the instant where the direction of the drive signal applied to the traverse motor becomes opposite to the direction of the drive signal applied to the tracking actuator, an optical recording/reproducing device can be provided with high-precision feed control.

What is claimed is:

1. An optical recording/reproducing device comprising:
   means for projecting a light beam that focus and project a light beam onto a recording medium;
   first means for movement that move said means for projecting a light beam by a minute amount in a direction practically perpendicular to a track on the recording medium;
   means for detecting track error that generate a signal corresponding to the positional relationship of the light beam and a track;
   means for controlling tracking that drive said first means for movement in response to a signal of said means for detecting track error and that exercise control such that the light beam scans the track;

second means for movement that move the light beam crosswise in a direction approximately perpendicular to the track on the recording medium by moving said means for projecting a light beam; and means for controlling searching that move the light beam across a plurality of tracks to a desired track; wherein said means for controlling searching comprise:

means for generating a target speed that generate a target speed for movement of the light beam;

means for detecting speed of movement that detect the speed of movement of the light beam;

first means for driving that drive said first means for movement in response to a difference signal of a signal of said means for generating a target speed and a signal of said means for detecting speed of movement; and second means for driving that drive said second means for movement in response to a difference signal of a signal of said means for generating a target speed and a signal of said means for detecting speed of movement, wherein said means for generating a target speed are constituted such as to generate and successively transmit for drive of second means for movement an acceleration signal that effects acceleration until a target maximum speed is reached, a fixed speed signal, and a deceleration signal that effects deceleration in response to distance from the target track, the time for which the deceleration signal is transmitted being set approximately to the reciprocal of the first-order resonant frequency of the first means for movement.

2. The optical recording/reproducing device according to claim 1, wherein said means for detecting speed of movement are constituted such as to detect the speed of movement of the light beam from a signal of said means for detecting tracking error.

3. The optical recording/reproducing device according to claim 1, wherein when the light beam is accelerated and decelerated by said second means for movement to move it from the current track to a desired track, deceleration of the light beam is commenced such that movement of the light beam is terminated prior to the desired track.

4. The optical recording/reproducing device according to claim 1, wherein the position of commencement of deceleration of the light beam is changed over by moving a prescribed number of tracks on start-up of the device or on changing the recording medium, measuring the error from the desired track that then results, and supplying this error to said second means for movement.

5. The optical recording/reproducing device according to claim 1, wherein the position of commencement of deceleration of the light beam is changed over by, on searching performed after device start-up, measuring the error from the desired track in the first movement, and supplying this error to said second means for movement.

6. The optical recording/reproducing device according to claim 1, wherein the position of commencement of deceleration of the light beam is changed over by moving a prescribed number of tracks on start-up of the device or on changing the recording medium, measuring the speed of the light beam at the completion of movement, and supplying this speed to said second means for movement.

7. The optical recording/reproducing device according to claim 1, wherein the position of commencement of deceleration of the light beam is changed over by, on searching performed after device start-up, measuring the speed of the light beam at the completion of the first movement, and supplying this speed to said second means for movement.

8. The optical recording/reproducing device according to claim 1, wherein, on searching performed after device start-up, the speed of the light beam at the completion of the first movement is measured, and, if the speed is larger than a prescribed speed, the maximum speed of said second means for movement that is generated by said means for generating a target speed is set lower.

9. The optical recording/reproducing device according to claim 1, wherein, on searching performed after device start-up, the error from the desired track in the first movement is measured, and, if the error is larger than a prescribed value, the maximum speed of said second means for movement that is generated by said means for generating a target speed is set lower.

10. The optical recording/reproducing device according to claim 1, wherein said means for detecting speed of movement comprise means for binary conversion that performs binary conversion on a signal of said means for detecting track error and means for detecting period that detect the period of the signal of said means for binary conversion and, if the period signal of said means for detecting period is outside a prescribed range, do not use this signal to detect the speed.

11. The optical recording/reproducing device according to claim 10 wherein, if the period signal of said means for detecting period is outside a prescribed range, the period signal detected on the previous occasion is employed.

12. The optical recording/reproducing device according to claim 11 wherein the prescribed range for decision regarding the period signal is larger than 1/n of the period signal detected on the previous occasion by said means for detecting period and smaller than N times this (where n and N are integers).

13. The optical recording/reproducing device according to claim 11 wherein if the period signal of said means for detecting period is outside the prescribed range more than a prescribed number of times the condition is deemed to be abnormal and the movement of the light beam is forcibly terminated.

14. The optical recording/reproducing device according to claim 10 constructed such that the prescribed range for decision regarding the period signal is changed over in accordance with the number of tracks of movement or the number of remaining tracks.

15. An optical recording/reproducing device comprising:

means for projecting a light beam that focus and project a light beam onto a recording medium;

first means for movement that move said means for projecting a light beam by a minute amount in a direction practically perpendicular to a track on the recoring medium;

means for detecting track error that generate a signal corresponding to the positional relationship of the light beam and a track;

means for controlling tracking that drive said first means for movement in response to a signal of said means for detecting track error and that exercise control such that the light beam scans the track;

second means for movement that move the light beam crosswise in a direction approximately perpendicular to the track on the recording medium by moving said means for projecting a light beam; and means for controlling searching that move the light beam across a plurality of tracks to a desired track; wherein said means for controlling searching comprise:

means for generating a target speed that generate a target speed for movement of the light beam;

means for detecting speed of movement that detect the speed of movement of the light beam;

means for subtraction that calculate the difference of a signal of said means for generating a target speed and a signal of said means for detecting speed of movement;

first means for driving that drive said first means for movement in response to a signal of said means for subtraction;

means for addition that add a prescribed signal and a signal of said means for subtraction; and second means for driving that drive said second means for movement in response to a signal of said means for addition, wherein said means for generating a target speed are constituted such as to generate and successively transmit for drive of second means for movement an acceleration signal that effects acceleration until a target maximum speed is reached, a fixed speed signal, and a deceleration signal that effects deceleration in response to distance from the target track, the time for which the deceleration signal is transmitted being set approximately to the reciprocal of the first-order resonant frequency of the first means for movement.

16. The optical recording/reproducing device according to claim 15, wherein said means for detecting speed of movement are constituted such as to detect the speed of movement of the light beam from a signal of said means for detecting tracking error.

17. The optical recording/reproducing device according to claim 15, wherein when the light beam is accelerated and decelerated by said second means for movement to move it from the current track to a desired track, deceleration of the light beam is commenced such that movement of the light beam is terminated prior to the desired track.

18. The optical recording/reproducing device according to claim 15, wherein the position of commencement of deceleration of the light beam is changed over by moving a prescribed number of tracks on start-up of the device or on changing the recording medium, measuring the error from the desired track that then results, and supplying this error to said second means for movement.

19. The optical recording/reproducing device according to claim 15, wherein the position of commencement of deceleration of the light beam is changed over by, on searching performed after device start-up, measuring the error from the desired track in the first movement, and supplying this error to said second means for movement.

20. The optical recording/reproducing device according to claim 15, wherein the position of commencement of deceleration of the light beam is changed over by moving a prescribed number of tracks on start-up of the device or on changing the recording medium, measuring the speed of the light beam at the completion of movement, and supplying this speed to said second means for movement.

21. The optical recording/reproducing device according to claim 15, wherein the position of commencement of deceleration of the light beam is changed over by, on searching performed after device start-up, measuring the speed of the light beam at the completion of the first movement, and supplying this speed to said second means for movement.

22. The optical recording/reproducing device according to claim 15, wherein, on searching performed after device start-up, the speed of the light beam at the completion of the first movement is measured, and, if the speed is larger than a prescribed speed, the maximum speed of said second means for movement that is generated by said means for generating a target speed is set lower.

23. The optical recording/reproducing device according to claim 15, wherein, on searching performed after device start-up, the error from the desired track in the first movement is measured, and, if the error is larger than a prescribed value, the maximum speed of said second means for movement that is generated by said means for generating a target speed is set lower.

24. The optical recording/reproducing device according to claim 15, wherein said means for detecting speed of movement comprise means for binary conversion that performs binary conversion on a signal of said means for detecting track error and means for detecting period that detect the period of the signal of said means for binary conversion and, if the period signal of said means for detecting period is outside a prescribed range, do not use this signal to detect the speed.

25. The optical recording/reproducing device according to claim 24 wherein, if the period signal of said means for detecting period is outside a prescribed range, the period signal detected on the previous occasion is employed.

26. The optical recording/reproducing device according to claim 25 wherein the prescribed range for decision regarding the period signal is larger than 1/n of the period signal detected on the previous occasion by said means for detecting period and smaller than N times this (where n and N are integers).

27. The optical recording/reproducing device according to claim 25 wherein if the period signal of said means for detecting period is outside the prescribed range more than a prescribed number of times the condition is deemed to be abnormal and the movement of the light beam is forcibly terminated.

28. The optical recording/reproducing device according to claim 24 constructed such that the prescribed range for decision regarding the period signal is changed over in accordance with the number of tracks of movement or the number of remaining tracks.

* * * * *